United States Patent [19]

Katayama

[11] Patent Number: 5,696,750
[45] Date of Patent: Dec. 9, 1997

[54] OPTICAL HEAD APPARATUS FOR DIFFERENT TYPES OF DISKS

[75] Inventor: Ryuichi Katayama, Tokyo, Japan

[73] Assignee: NEC Corporation, Japan

[21] Appl. No.: 658,373

[22] Filed: Jun. 5, 1996

[30] Foreign Application Priority Data

| Jun. 5, 1995 | [JP] | Japan | 7-137675 |
| Aug. 15, 1995 | [JP] | Japan | 7-208026 |
| Sep. 7, 1995 | [JP] | Japan | 7-230099 |
| Mar. 7, 1996 | [JP] | Japan | 8-049781 |

[51] Int. Cl.$^6$ ............................................. G11B 7/00
[52] U.S. Cl. ................................. 369/112; 369/109
[58] Field of Search ............................ 369/112, 103, 369/109, 110, 44.12, 120, 121

[56] References Cited

U.S. PATENT DOCUMENTS 5,202,860  4/1993  Takahashi et al. .................. 369/110
5,450,378  9/1995  Hekker ................................. 369/103

OTHER PUBLICATIONS

Y. Komma et al., "Dual Focus Optical Head for 0.6 mm and 1.2 mm Disk", Optical Review vol. 1, No. 1, pp. 27–29, 1994.

Primary Examiner—Nabil Hindi
Attorney, Agent, or Firm—Hayes, Soloway, Hennessey, Grossman & Hage, P.C.

[57] ABSTRACT

In an optical head apparatus for two or more different types of discs, there are provided a first light source for a first wavelength light beam, a second light source for a second wavelength light beam, and an objective lens for leading the first and second wavelength light beans to one of the discs. A holographic optical element is provided to converge or diverge only one of the first and second wavelength light beams. Or, an aperture limiting element is provided to adjust an effective numerical aperture of the objective lens for only one of the first and second wavelength light beams.

24 Claims, 34 Drawing Sheets

λ=635nm

λ=785nm

λ=635nm

λ=785nm

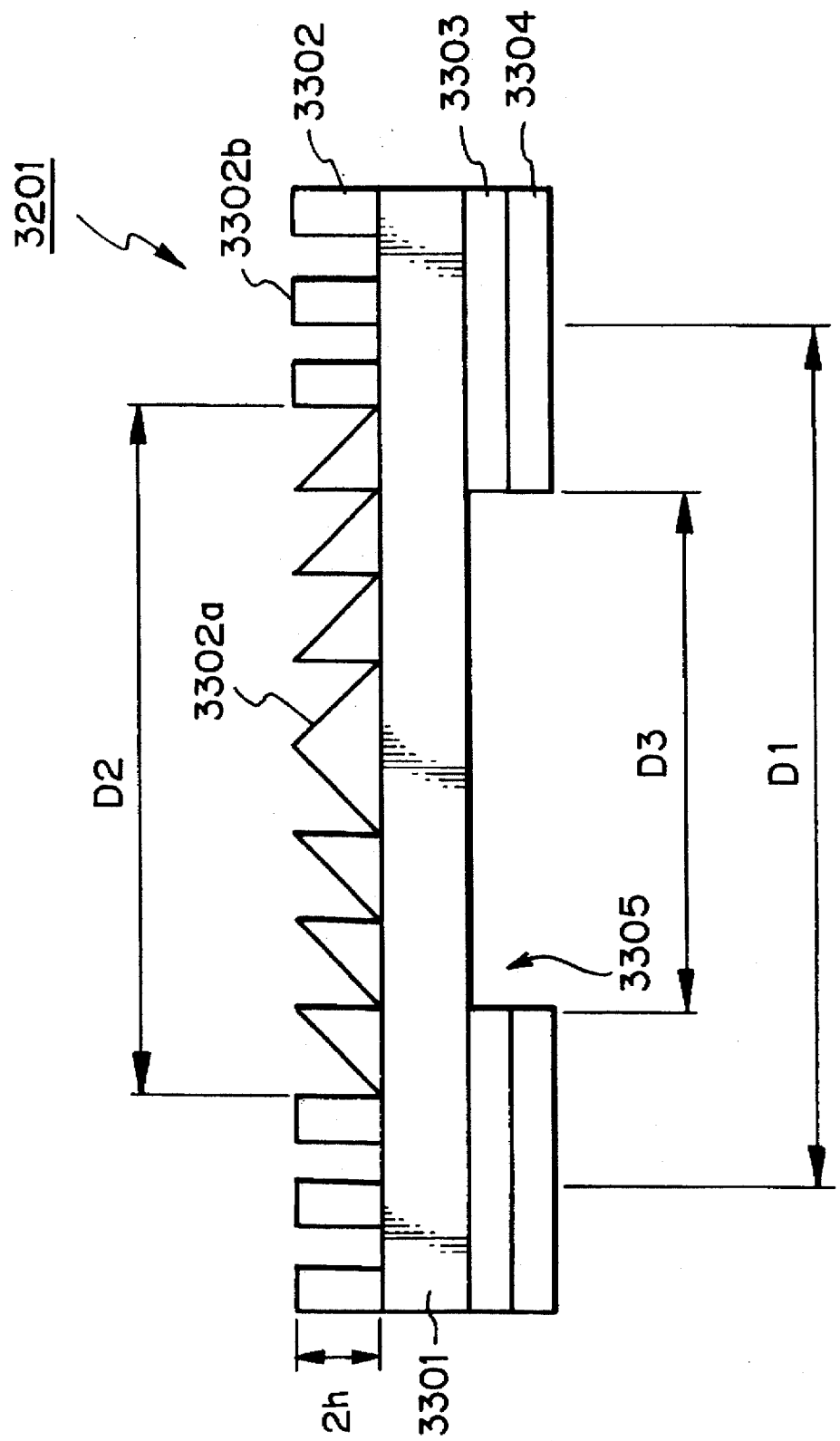

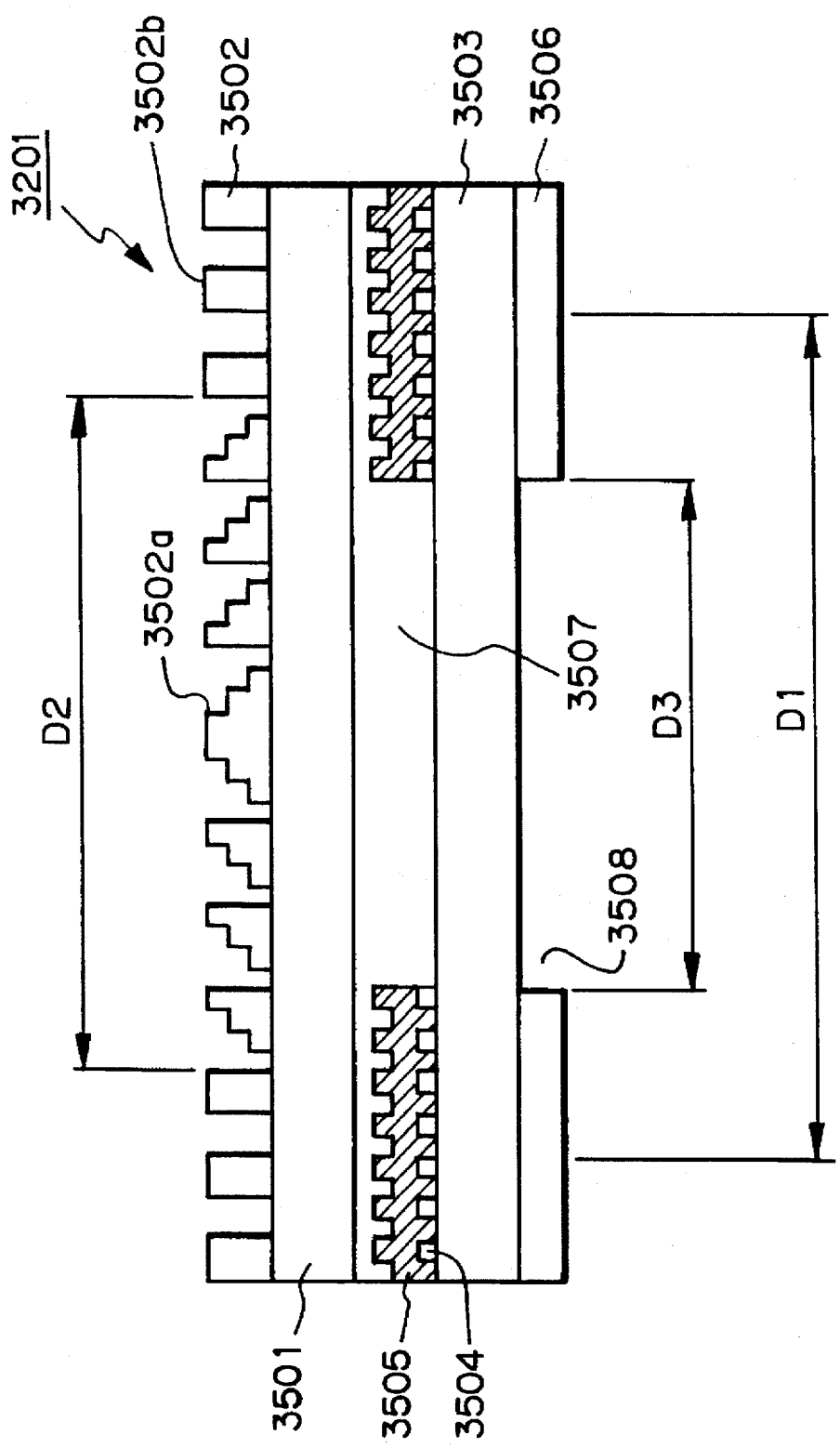

OPTICAL HEAD APPARATUS FOR DIFFERENT TYPES OF DISKS

BACKGROUND OF THE INVENTION

1. Field of the Invention

The present invention relates to an optical head apparatus for different types of disks which have different thicknesses and/or different densities.

2. Description of the Related Art

A first prior art optical head apparatus has been known for two types of disks, i.e., a high density thin disk such as a 0.6 mm thick digital video disk and a low density thick disk such as a 1.2 mm thick compact disk (see: Y. Komma et al., "Dual Focus Optical Head for 0.6 mm and 1.2 mm Disks", Optical Review Vol. 1, No. 1, pp. 27–29, 1994). This first prior art optical head apparatus includes a single light source for a light beam, an objective lens for leading the light beam to one of the disks, and a holographic optical element for splitting the light beam into a zeroth order light beam (transmission light beam) and a +1st order diffraction light beam. As a result, the transmission light beam passes through the objective lens, so that this light beam can be focused at one type of the disks. On the other hand, the +1st order diffraction light beam passes through the objective lens, so that this light beam can be focused at another type of the disks. This will be explained later in detail.

In the above-described first prior art apparatus, however, since the incident light beam is split into the transmission light beam and the +1st order diffraction light beam, the efficiency of the light beam is low, this reducing the signal-to-noise (S/N) ratio.

A second prior art optical head apparatus has been known for two types of disks, i.e., a high density thick disk such as a 1.2 mm thick digital video disk and a low density thick disk such as a 1.2 mm thick compact disk. This second prior art optical head apparatus includes a single light source for a light beam and an objective lens for leading the light beam to one of the disks. This will be explained later in detail.

In the above-described second prior art apparatus, however, it is actually impossible to read the two types of disks whose densities are different.

SUMMARY OF THE INVENTION

It is an object of the present invention to provide an optimum optical head apparatus for different types of disks.

According to the present invention, in an optical head apparatus for two or more different types of disks, there are provided a first light source for a first wavelength light beam, a second light source for a second wavelength light beam, and an objective lens for leading the first and second wavelength light beams to one of the disks. A holographic optical element is provided to converge or diverge only one of the first and second wavelength light beams. Or, an aperture limiting element is provided to adjust an effective numerical aperture of the objective lens for only one of the first and second wavelength light beams.

BRIEF DESCRIPTION OF THE DRAWINGS

The present invention will be more clearly understood from the description as set forth below, in comparison with the prior art, with reference to the accompanying drawings, wherein:

FIG. 33 is a cross-sectional view of a first example of the aperture limiting holographic optical element of FIG. 32;

FIG. 35 is a cross-sectional view of a second example of the aperture limiting holographic optical element of FIG. 32;

DESCRIPTION OF THE PREFERRED EMBODIMENTS

Before the description of the preferred embodiments, prior art optical head apparatuses will be explained with reference to FIGS. 1, 2, 3A, 3B and 4.

Figure 1:
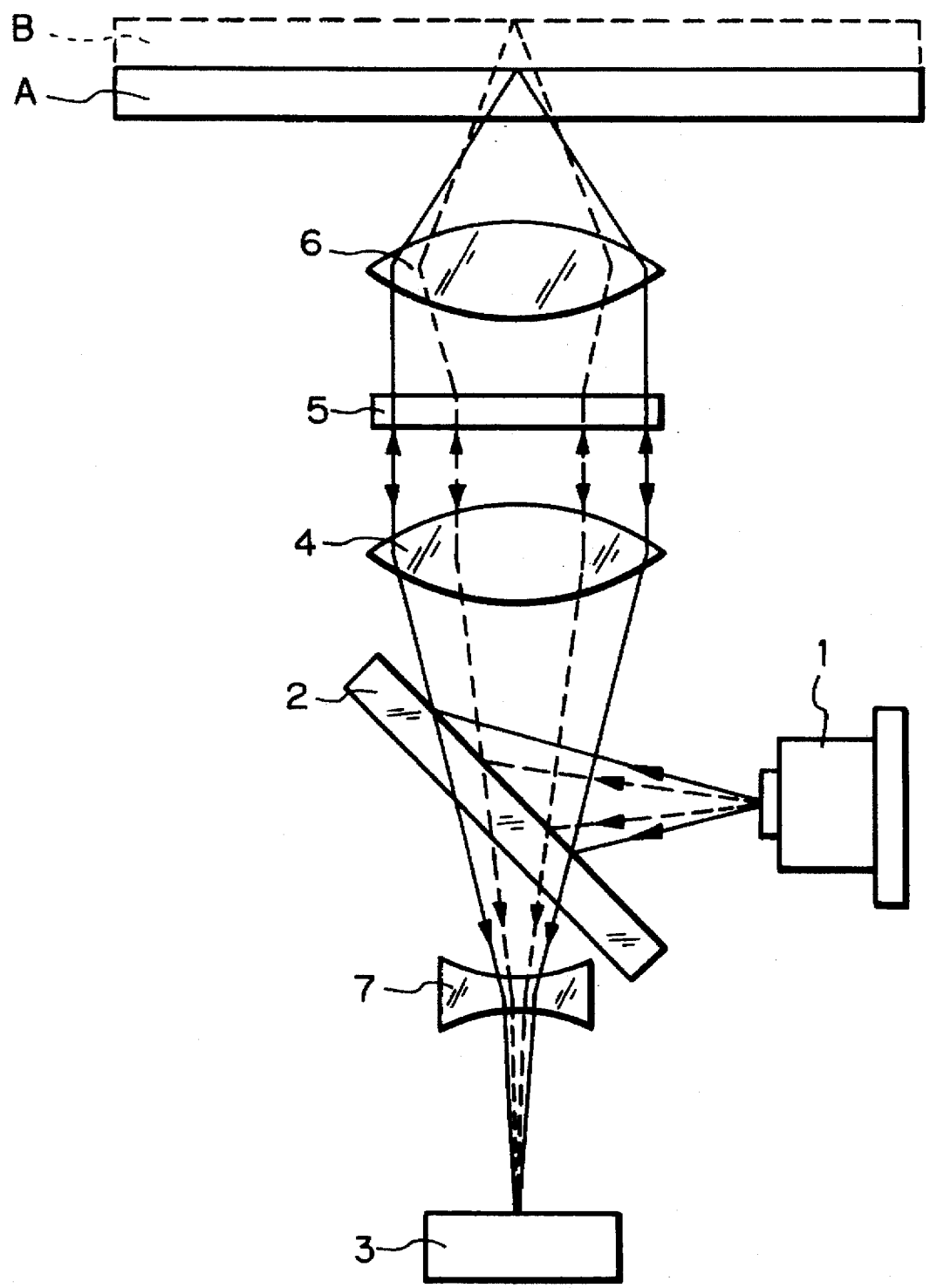
FIG. 1 is a diagram illustrating a first prior art optical head apparatus.

In FIG. 1, which illustrates a first prior art optical head apparatus (see: Y. Komma et al, "Dual Focus Optical Head for 0.6 mm and 1.2 mm Disks", Optical Review, Vol. 1, No. 1, pp. 27–29, 1994), reference A designate a high density thin disk such as is an about 0.6 mm thick digital video disk, and B is a low density thick disk such as an about 1.2 mm thick compact disk-recordable (CD-R). Note that only one of the disks A and B is mounted on the apparatus.

In FIG. 1, reference numeral 1 designates a laser diode for emitting a light beam to a half mirror 2, and reference numeral 3 designates a quadrant photodetector. Provided between the half mirror 2 and the disk A (or B) are a collimator lens 4, a holographic optical element 5 and an objective lens 6. Also, provided between the half mirror 2 and the photodetector 3 is a concave lens 7.

About half of the light beam emitted from the laser diode 1 is reflected at the half mirror 7 and is incident to the collimator lens 4 which generates a collimated light beam. The collimated light beam is incident to the holographic optical element 5.

A zeroth order light beam (transmission light beam) of the holographic optical element 5 is incident as a collimated light beam to the objective lens 6, and then, is focused on the disk A. A reflected light beam from the disk A is again incident via the objective lens 6 to the holographic optical element 5, and is split into a zeroth order light beam (transmission light beam) and a +1st order diffraction light beam at the holographic optical element 5.

On the other hand, a +1st order diffraction light beam of the holographic optical element 5 is incident as a divergent light beam to the objective lens 6 and then, is focused on the disk B. A reflected light beam from the disk B is again incident via the objective lens 6 to the holographic optical element 5, and is split into a zeroth order light beam (transmission light beam) and a +1st order diffraction light beam at the holographic optical element 5.

The transmission light beam at the holographic optical element 5 of the reflected light beam from the disk A and the +1st order diffraction light beam at the holographic optical element 5 of the reflected light beam from the disk B are incident as collimated light beams to the collimator lens 4.

Half of the light beam passed through the collimator lens 4 passes through the half mirror 2, and further passes through the concave lens 7 to reach the photodetector 3.

In the photodetector 3, a focusing error signal is detected by an astigmatism method using astigmatism generated at the half mirror 2, and a tracking error signal is detected by a push-pull method. Also, an information signal is detected by a sum of the four outputs of the photodetector 3.

The objective lens 6 has a spherical aberration capable of compensating for a spherical aberration caused when the outgoing transmission light beam of the objective lens 6 is incident to the disk A and returns therefrom, Therefore, the zeroth order light beam (transmission light beam) of the holographic optical element 5 can be focused at the disk A without aberrations. On the other hand, the holographic optical element 5 has a spherical aberration capable of compensating for a sun of a spherical aberration caused when the outgoing +1st order diffraction light beam of the holographic optical element 5 is incident to the disk B and returns therefrom and a spherical aberration of the objective lens 6 caused when the outgoing +1st order diffraction light beam of the holographic optical element 5 is incident to the objective lens 6 and returns therefrom. Therefore, the +1st order diffraction light beam of the holographic optical element 5 can be focused at the disk B without aberrations.

Figure 2:
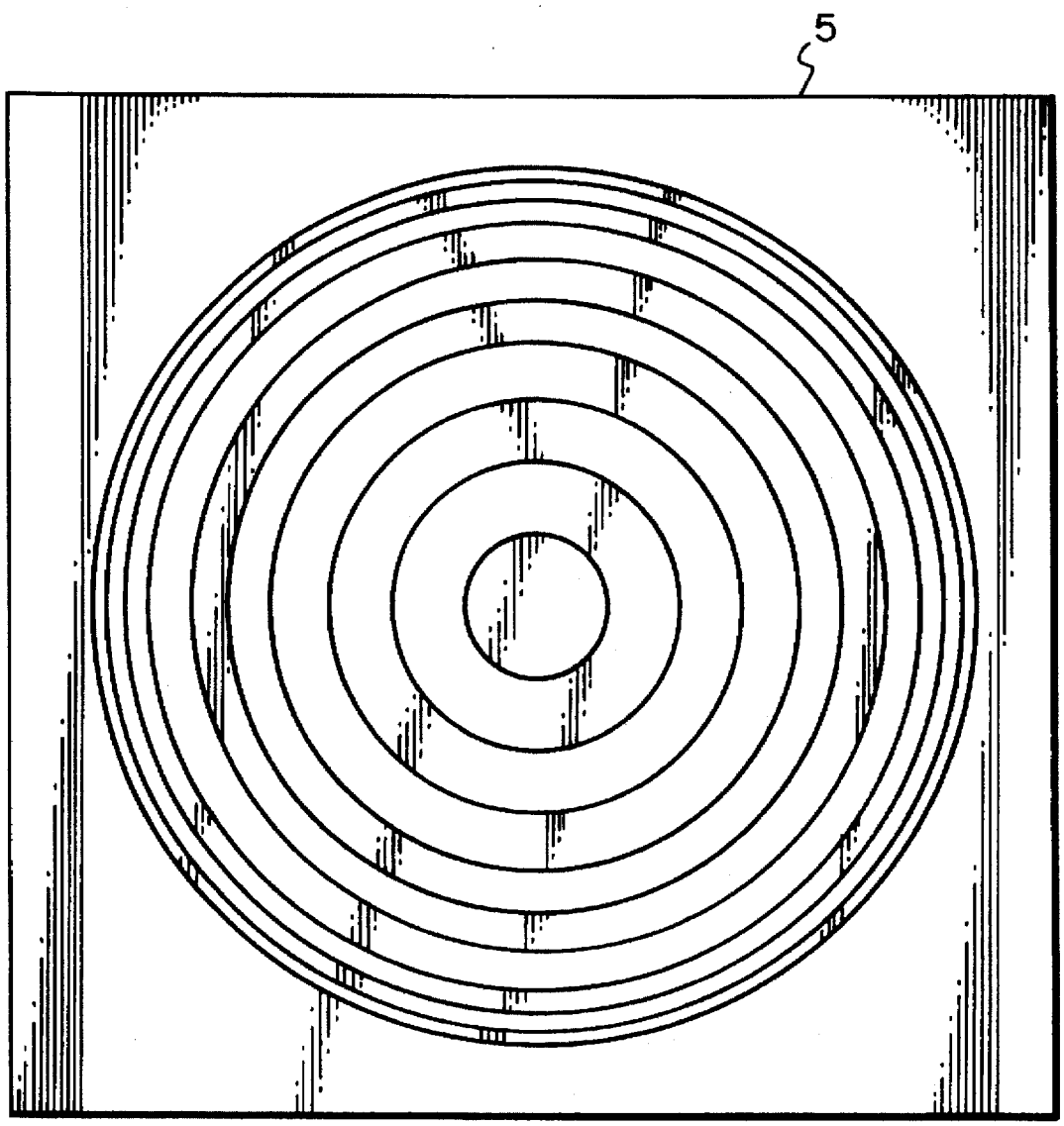
FIG. 2 is a plan view of the holographic optical element of FIG. 1.

In FIG. 2, which is a plan view of the holographic optical element 5 of FIG. 1, the holographic optical element 5 includes concentric interference fringes. Therefore, the holographic optical element 5 can compensate for the above-described spherical aberration of the +1st order diffraction light beam, and also can serve as a concave lens for the +1st order diffraction light beam. As a result, the focal point of the +1st order diffraction light beam at the disk B is far from the focal point of the transmission light beam at the disk A, so that the distance between the surface of the disk A and the objective lens 6 can be about the same as the distance between the surface of the disk B and the objective lens 6.

Figure 3A:
FIGS. 3A and 3B are cross-sectional views of the holographic optical element of FIG. 1.

In FIG. 3A, which is a cross-sectional view of the holographic optical element 5 of FIG. 1, the grating shape is rectangular, and as a result, a spurious −1st order diffraction light beam as well as the +1st order diffraction light beam is generated, and in this case, the intensity of the −1st order diffraction light beam is about the same as that of the +1st order diffraction light beam. Thus, the efficiency of light is reduced.

Figure 3B:
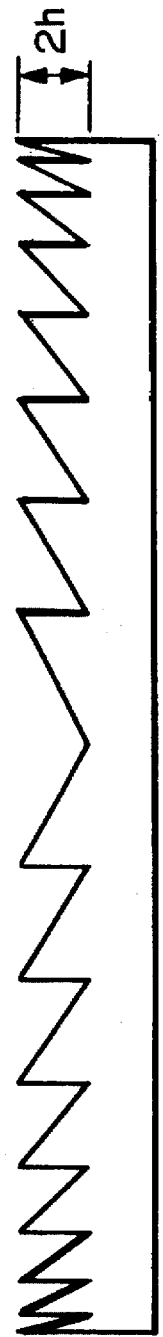

In FIG. 3B, which is also a cross-sectional view of the holographic optical element 5 of FIG. 1, the grating shape is blazed, and as a result, the intensity of the +1st order diffraction light beam is increased while the intensity of the −1st order diffraction light beam is decreased. In this case, if the height of the saw-tooth portion is 2h, the refractive index is n, and the wavelength of the incident light is λ, the transmittance $\eta_0$ and the diffraction efficiency $\eta_{+1}$ of +1st order diffraction light are represented by $$\eta_0 = (\sin^2\phi)/\phi^2 \quad (1)$$

$$\eta_{+1} = (\sin^2\phi)/(\phi-\pi)^2 \quad (2)$$

where $\phi = 2\pi(n-1)h/\lambda$

If $\phi = \pi/2$, $\eta_0 = \eta_{+1} = 0.405$, so that the efficiency of the going and returning light is $\eta_0^2 = \eta_{+1}^2 = 0.164$. Therefore, the amount of light received by the photodetector 3 is only 0.164 times as compared with a conventional optical head apparatus, which reduces the S/N ratio of an information signal. In other words, if the power of the laser diode 1 is increased to 6.10 times as compared with the conventional laser diode for a non-dual focus optical head apparatus, the photodetector 3 receives light whose amount is the same as the conventional photodetector. Further, in order to write the disk A or B, the power of the laser diode 1 has to be further increased; however, it is actually impossible to further increase the power of the laser diode 1.

Further, in the first prior art optical head apparatus, the wavelength of the laser diode 1 for the disk A which is, in this case, a digital video disk is 635 to 655 nm to obtain a small focused spot. On the other hand, the wavelength of the laser diode 1 for the disk B which is, in this case, a compact disk-recordable (CD-R) using organic dye material has to be 785 nm, so that a reflectivity higher that 70% is obtained. If the wavelength of the laser diode 1 is 635 to 655 nm, a reflectivity of only about 10% is obtained, so that it is impossible to read the CD-R.

Figure 4:
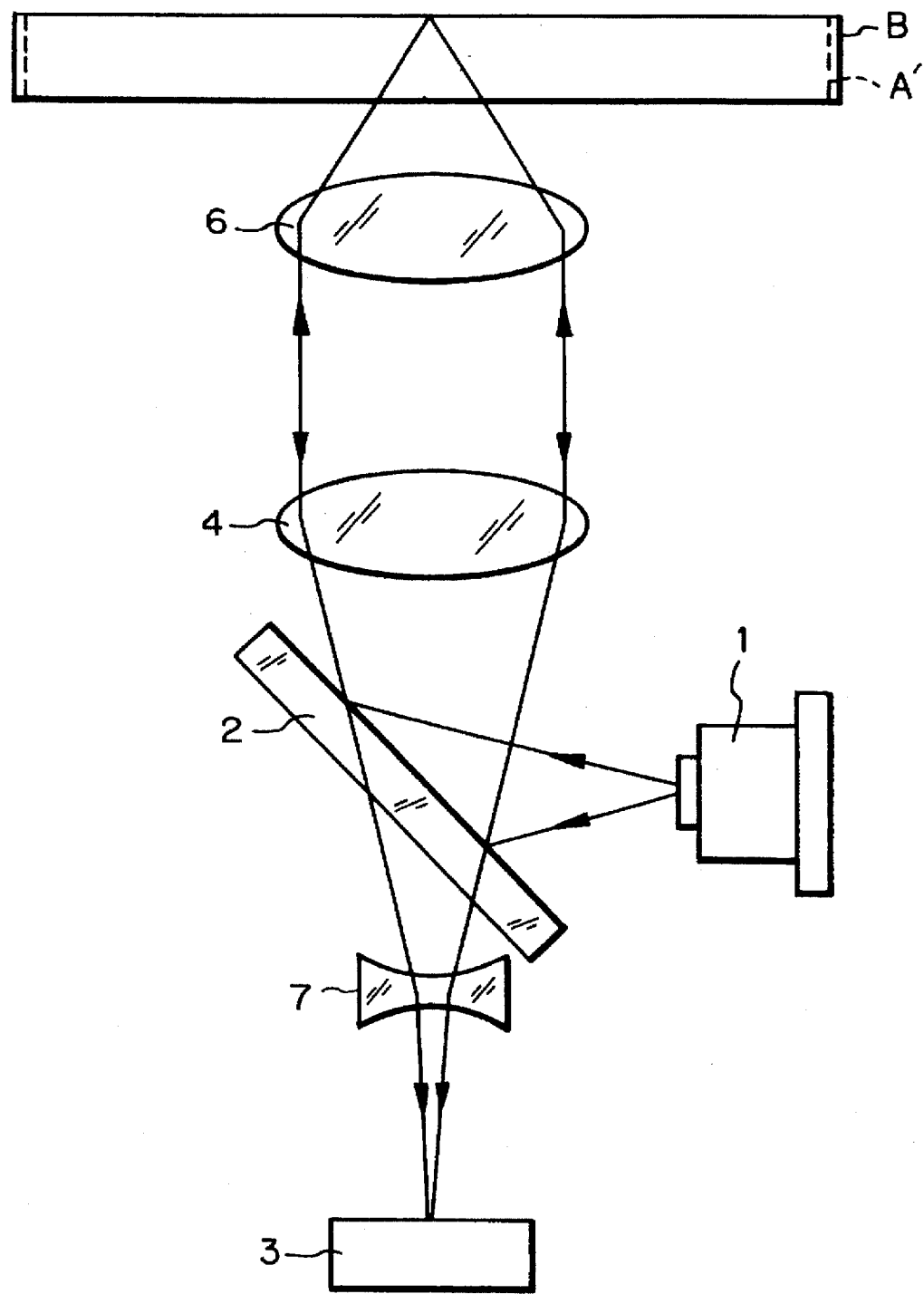
FIG. 4 is a diagram illustrating a second prior art optical head apparatus.

In FIG. 4, which illustrates a second prior art optical head apparatus, A' is a high density disk such as an about 1.2 nm thick digital video disk, and the disk B is a low density thick disk such as an about 1.2 mm thick CD-R. Note that one of the disks A' and B is mounted on the apparatus.

In FIG. 4, the holographic optical element 5 of FIG. 1 is not provided, since the disks A' and B have the same thickness. Note that the radius of the focused spot at the disk A' or B is generally inversely proportional to the numerical aperture (NA) of the objective lens 6 and is proportional to the wavelength of the laser diode 1.

For the disk A', in order to decrease the focused spot in response to the high density, the numerical aperture of the objective lens 6 is made large, for example, 0.52 to 0.6, and the wavelength of the laser diode 1 is made small, for example, 635 to 655 nm.

On the other hand, for the disk B, since the tolerance of the disk tilt has to be large, so that, it is necessary to suppress the generation of coma caused by the disk tilt, the numerical aperture of the objective lens 6 is made small, for example, 0.45. In addition, the CD-R type disk B is designed so that a reflectivity of higher than 70% can be obtained for a 785 nm wavelength, the wavelength of the laser diode 1 is made about 785 nm.

Thus, in the optical head apparatus of FIG. 4, two kinds of numerical apertures are required for the objective lens 6 in order to read the two kinds of disks A' and B; therefore, it is actually impossible for the optical head apparatus of FIG. 4 to read the two kinds of disks A' and B.

Figure 5:
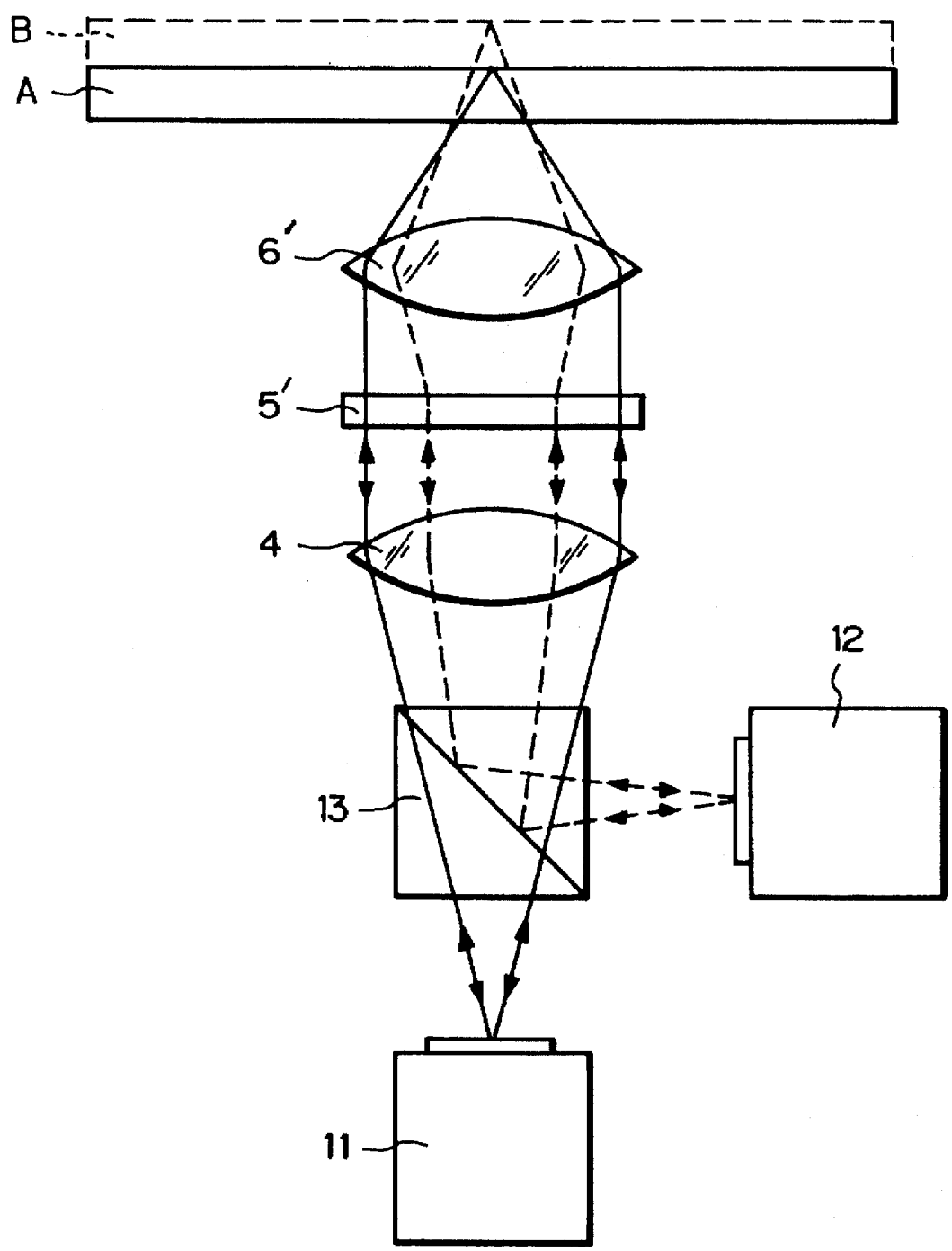
FIG. 5 is a diagram illustrating a first embodiment of the optical head apparatus according to the present invention.

In FIG. 5, which illustrates a first embodiment of the present invention, modules 11 and 12 and an interference filter 13 are provided instead of the laser diode 1, the half mirror 2, the photodetector 3 and the concave lens 7 of FIG. 1. Also, the holographic optical element 5 and the objective lens 6 of FIG. 1 are modified into a holographic optical element 5' and an objective lens 6', respectively.

The module 11 includes a laser diode for a 635 nm wavelength light beam and a photodetector, while the module 12 includes a laser diode for a 785 nm wavelength light beam and a photodetector. The interference filter 13 transmits most of the 635 nm wavelength light beam therethrough, while the interference filter 13 reflects most of the 785 nm wavelength light beam.

The 635 nm wavelength light beam emitted from the laser diode of the module 11 passes through the interference filter 13 and is incident to the collimator lens 4 which generates a collimated light beam. The collimated light beam is incident to the holographic element 5'. Then, a zeroth order light beam (transmission light beam) of the holographic optical element 5' is incident as a collimated light beam to the objective lens 6' and then, is focused on the disk A. A reflected light beam from the disk A is again incident via the objective lens 6' to the holographic optical element 5'. The zeroth order light beam passes through the interference filter 13 to reach the photodetector of the module 11.

On the other hand, the 785 nm wavelength light beam emitted from the laser diode of the module 12 is reflected by the interference filter 13 and is incident to the collimator lens 4 which generates a collimated light beam. The collimated light beam is incident to the holographic optical element 5'. Then, a −1st order diffraction light beam of the holographic optical element 5' is incident as a divergent light beam to the objective lens 6', and then, is focused on the disk B. A reflected light beam from the disk B is again incident via the objective lens 6' to the holographic optical element 5'. The −1st order diffraction light beam is reflected by the interference filter 13 and reaches the photodetector of the module 12.

In FIG. 5, the objective lens 6' has a spherical aberration capable of compensating for a spherical aberration caused when the 635 nm wavelength outgoing transmission light beam of the objective lens 6' is incident to the disk A and returns therefrom. Therefore, the zeroth order 635 nm wavelength light beam (transmission light beam) of the holographic optical element 5' can be focused at the disk A without aberrations. On the other hand, the holographic optical element 5' has a spherical aberration capable of compensating for a sum of a spherical aberration caused when the 785 nm wavelength outgoing −1st order diffraction light beam of the holographic optical element 5' is incident to the disk B and returns therefrom and a spherical aberration of the objective lens 6' caused when the outgoing −1st order diffraction 785 nm wavelength light beam of the holographic optical element 5' is incident to the objective lens 6' and returns therefrom. Therefore, the −1st order diffraction 785 nm wavelength light beam of the holographic optical element 5' can be focused at the disk B without aberrations.

Also, the holographic optical element 5' includes concentric interference fringes as illustrated in FIG. 2. Therefore, the holographic optical element 5' can compensate for the above-described spherical aberration of the −1st order diffraction 785 nm wavelength light beam, and also can serve as a concave lens for the −1st order diffraction 785 nm wavelength light beam. As a result, the focal point of the −1st order diffraction light beam at the disk B is far from the focal point of the transmission light beam at the disk A, so that the distance between the surface of the disk A and the objective lens 6' can be about the same as the distance between the surface of the disk B and the objective lens 6'.

Figure 6A:
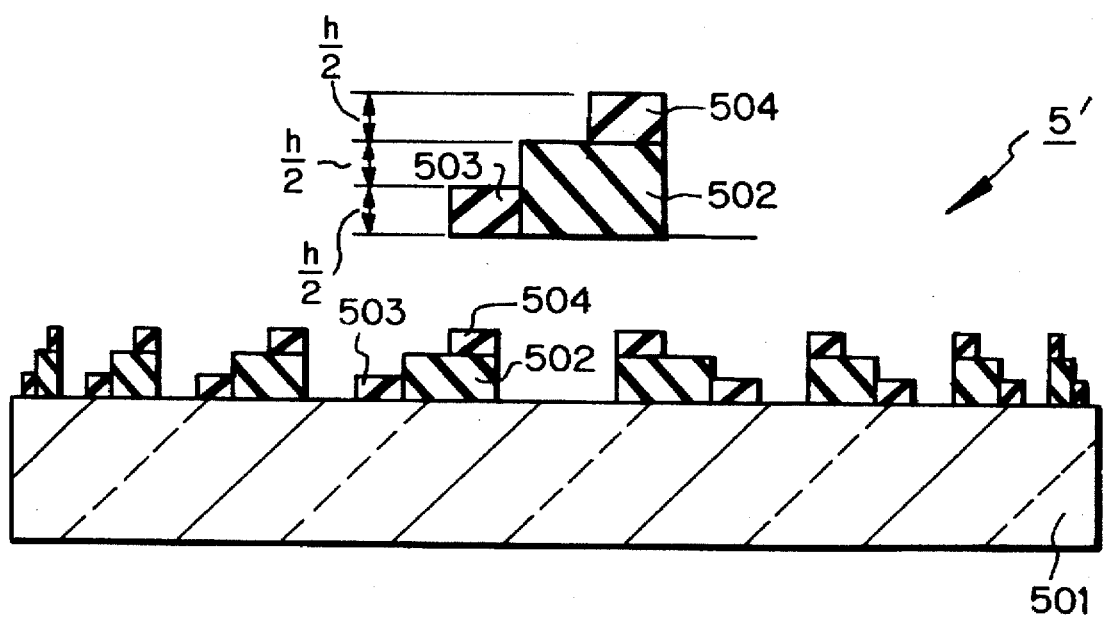
FIGS. 6A and 6B are cross-sectional views of a part of the holographic optical element of FIG. 5.
Figure 6B:
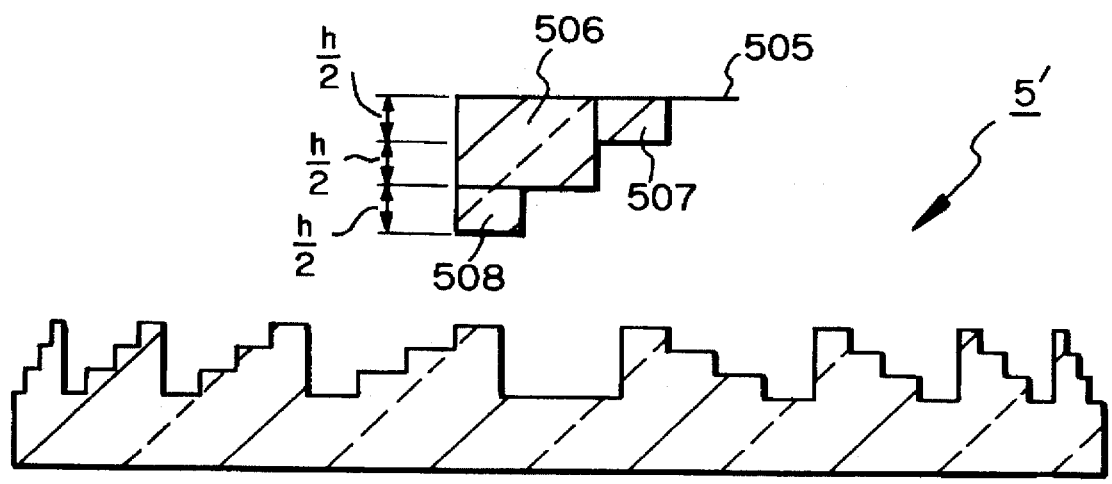

In FIGS. 6A and 6B, which are cross-sectional views of a part of the holographic optical element 5' of FIG. 5, the grating shape is staircuse. For example, in order to form the holographic optical element 5' of FIG. 6A, a first silicon oxide layer is deposited on a glass substrate 501, and then a silicon oxide pattern 502 is formed by a photolithography process. Next, a second silicon oxide layer is deposited on the silicon oxide pattern 502, and then, silicon oxide patterns 503 and 504 are simultaneously formed by a photolithography process. On the other hand, in order to form the holographic optical element 5' of FIG. 6B, a glass substrate 505 is etched by a photolithography process to form a groove 506 within the glass substrate 505. Next, the glass substrate 505 is etched by a photolithography process to form grooves 507 and 508 within the glass substrate 505.

In FIGS. 6A and 6B, if the height of the staircase portion is h/2, the refractive index is n, and the wavelength of the incident light is $\lambda$, the transmittance $\eta_0$, the diffraction efficiency $\eta_{+1}$ of the +1st order diffraction light and the diffraction efficiency $\eta_{-1}$ of the −1st order diffraction light are represented by $$\eta_0 = \cos^2(\phi/2) \cos^2(\phi/4) \qquad (3)$$

$$\eta_{+1} = (8/\pi^2) \sin^2(\phi/2) \cos^2[(\phi-\pi)/4] \quad (4)$$

$$\eta_{-1} = (8/\pi^2) \sin^2(\phi/2) \cos^2[(\phi+\pi)/4] \quad (5)$$

where $\phi = 2\pi(n-1)h/\lambda$

For example, if h=2.76 μm and n=1.46, then $\phi = 4\pi$ for $\lambda=635$ nm. Therefore, $\eta_0 = 1$, $\eta_{+1} = 0$ and $\eta_{-1} = 0$ As a result, the efficiency of the going and returning 635 nm wavelength light is $\eta_0^2 = 1$.

Thus, the S/N ratio of the information signal at the photodetector of the module 11 is almost the same as that in the conventional non-dual focus optical head apparatus. This also makes it possible to write the disk A.

On the other hand, $\phi = 3.23\pi$ for $\lambda=785$ nm. Therefore, $\eta_0 = 0.0851$, $\eta_{+1} = 0.023$ and $\eta_{-1} = 0.685$ As a result, the efficiency of the going and returning 785 nm wavelength light is $\eta_{-1}^2 = 0.471$ Therefore, the amount of light received by the photodetector of the module 12 is 0.471 times as compared with a conventional optical head apparatus, so that the S/N ratio of the information signal is hardly reduced. Also, if the power of the laser diode of the module 12 is increased to 2.12 times as compared with the conventional laser diode for a non-dual focus optical head apparatus, the photodetector of the module 12 receives light whose amount is the same as the conventional photodetector. Note that it is easy to increase the power of the laser diode of the module 12 at such a level.

Further, the wavelength of the laser diode of the module 12 for the disk B which is, in this case, a CD-R using organic dye material, is 785 nm, so that it is possible to write the CD-R.

Figure 7:
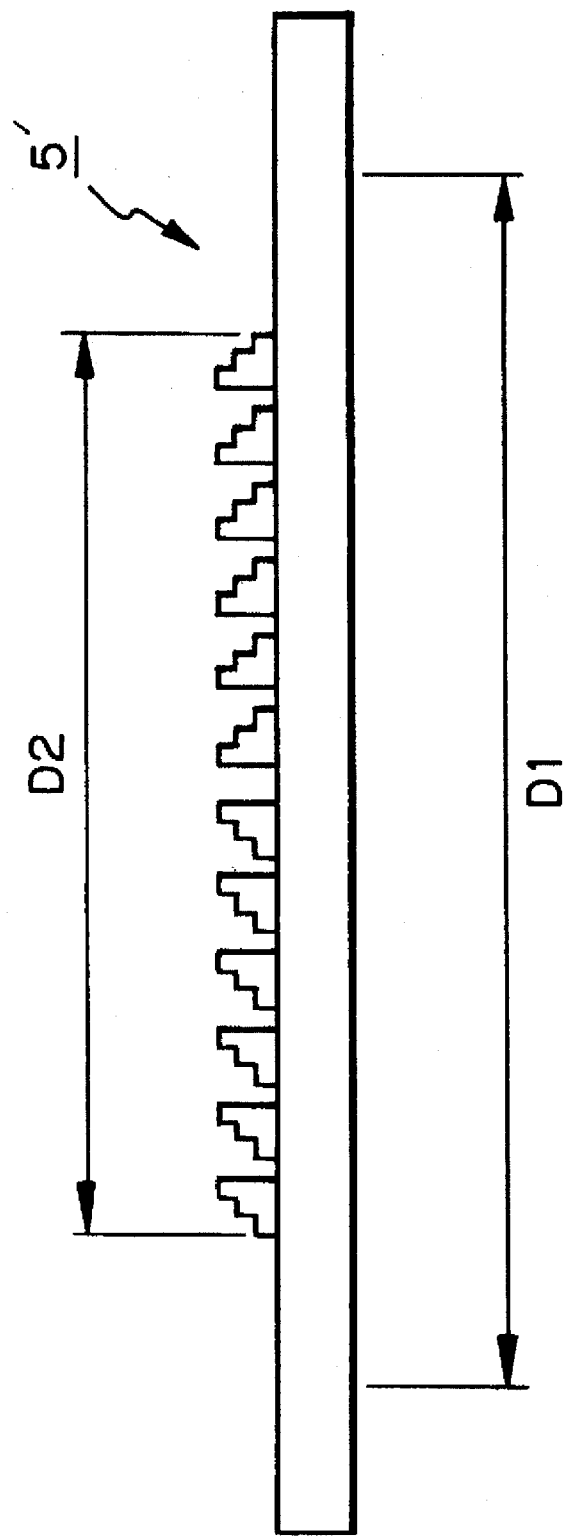
FIG. 7 is a cross-sectional view of the entire holographic optical element of FIG. 5.

In FIG. 7, which is a cross-sectional view of the entire holographic optical element 5' of FIG. 5, reference D1 designates an effective diameter of the objective lens 6'. In this case, concentric interference fringes are provided only inside an area having a diameter D2 smaller than the effective diameter D1. Therefore, the 635 nm wavelength light completely passes through the inside of the area defined by the diameter D1. On the other hand, 68.8% of the 785 nm wavelength light is diffracted as a −1st order diffraction light by the inside of the area defined by the diameter D2, while the 785 nm wavelength light completely passes through the inside of the area defined by the diameter D2. Note that, if a focal length f of the objective lens 6 is 2.6 mm and the diameters D1 and D2 are 1.56×2 mm and 1.17×2 mm, respectively, the effective numerical aperture for the 635 nm wavelength light is D1/2f=0.6, and the effective numerical aperture for the 785 nm wavelength light is D2/2f=0.45.

Figure 8:
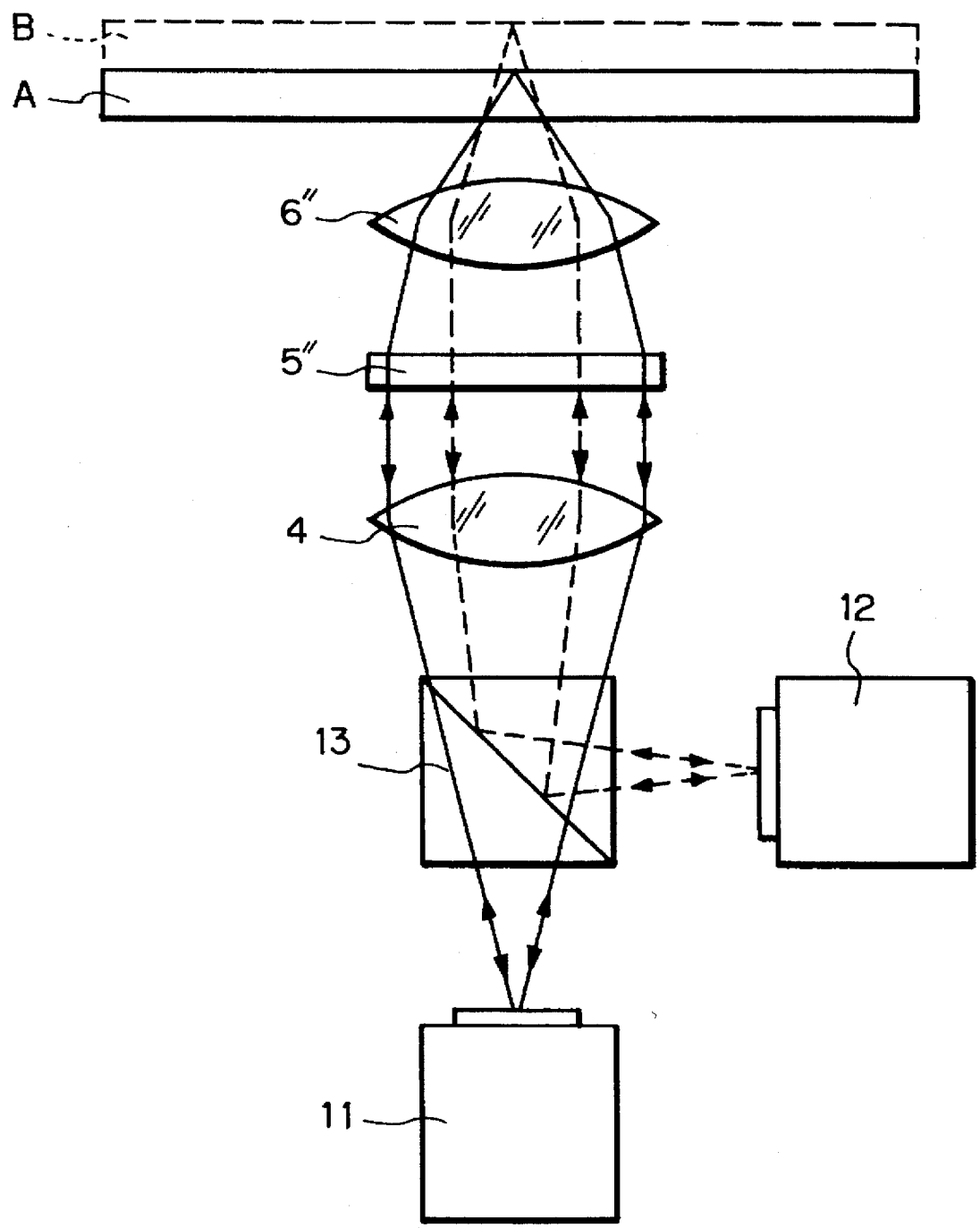
FIG. 8 is a diagram illustrating a second embodiment of the optical head apparatus according to the present invention.

In FIG. 8, which illustrates a second embodiment of the present invention, the holographic optical element 5' and the objective lens 6' of FIG. 5 are modified into a holographic optical element 5" and an objective lens 6", respectively.

The 635 nm wavelength light beam emitted from the laser diode of the module 11 passes through the interference filter 13 and is incident to the collimator lens 4 which generates a collimated light beam. The collimated light beam is incident to the holographic optical element 5". Then, a +1st order diffraction light beam of the holographic optical element 5" is incident as a convergent light beam to the objective lens 6", and then, is focused on the disk A. A reflected light beam from the disk A is again incident via the objective lens 6" to the holographic optical element 5". The +1st order diffraction light beam passes through the interference filter 13 to reach the photodetector of the module 11.

On the other hand, the 785 nm wavelength light beam emitted from the laser diode of the module 12 is reflected by the interference filter 13 and is incident to the collimator lens 4 which generates a collimated light beam. The collimated light beam is incident to the holographic optical element 5". Then, a zeroth order light beam (transmission light beam) of the holographic optical element 5" is incident as a collimated light beam to the objective lens 6", and then, is focused on the disk B. A reflected light beam from the disk B is again incident via the objective lens 6" to the holographic optical element 5". The zeroth order light beam is reflected by the interference filter 13 and reaches the photodetector of the module 12.

In FIG. 8, the objective lens 6" has a spherical aberration capable of compensating for a spherical aberration caused when the 785 nm wavelength outgoing transmission light beam of the objective lens 6" is incident to the disk B and returns therefrom. Therefore, the zeroth order 785 nm wavelength light beam (transmission light beam) of the holographic optical element 5" can be focused at the disk B without aberrations. On the other hand, the holographic optical element 5" has a spherical aberration capable of compensating for a sum of a spherical aberration caused when the 635 nm wavelength outgoing +1st order diffraction light beam of the holographic optical element 5" is incident to the disk A and returns therefrom and a spherical aberration of the objective lens 6" caused when the outgoing +1st order diffraction 635 nm wavelength light beam of the holographic optical element 5" is incident to the objective lens 6" and returns therefrom. Therefore, the +1st order diffraction 635 nm wavelength light beam of the holographic optical element 5" can be focused at the disk A without aberrations.

Also, the holographic optical element 5" includes concentric interference fringes as illustrated in FIG. 2. Therefore, the holographic optical element 5" can compensate for the above-described spherical aberration of the +1st order diffraction 635 nm wavelength light beam, and also can serve as a convex lens for the +1st order diffraction 635 nm wavelength light beam. As a result, the focal point of the +1st order diffraction light beam at the disk A is near from the focal point of the transmission light beam at the disk B, so that the distance between the surface of the disk A and the objective lens 6" can be about the same as the distance between the surface of the disk B and the objective lens 6".

The holographic optical element 5" of FIG. 8 is also illustrated in FIGS. 6A and 6B. For example, in the above-mentioned formulae (3), (4) and (5), if h=3.45 μm and n=1.46, then $\phi = 5\pi$ for $\lambda=635$ nm Therefore, $\eta_0 = 0$, $\eta_{+1} = 0.811$ and $\eta_{-1} = 0$ As a result, the efficiency of the going and returning 635 nm wavelength light is $\eta_{+1}^2 = 0.658$ On the other hand, $\phi = 4.04\pi$ for $\lambda=785$ nm Therefore, $\eta_0 = 0.955$, $\lambda_{+1} = 0.002$ and $\eta_{-1} = 0.001$ As a result, the efficiency of the going and returning 785 nm wavelength light is $\eta_o^2 = 0.990$ Thus, the diffraction efficiency of the +1st order diffraction light is increased while the diffraction efficiency of the −1st order diffraction light is decreased.

Therefore, the amount of light received by the photodetector of the module 11 is 0.658 times as compared with a conventional optical head apparatus, so that the S/N ratio of the information signal is hardly reduced. If the power of the laser diode of the module 11 is increased to 1.52 times as compared with the conventional laser diode for a non-dual focus optical head apparatus, the photodetector of the module 11 receives light whose amount is the same as the conventional photodetector. Note that it is easy to increase the power of the laser diode of the module 11 at such a level.

Therefore, the S/N ratio of the information signal at the photodetector of the module 12 is almost the same as that in the conventional non-dual focus optical head apparatus. This also makes it possible to write the disk B.

Further, the wavelength of the laser diode of the module 12 for the disk B which is in this case, a CD-R using organic dye material is 785 nm, so that it is possible to read the CD-R.

Figure 9:
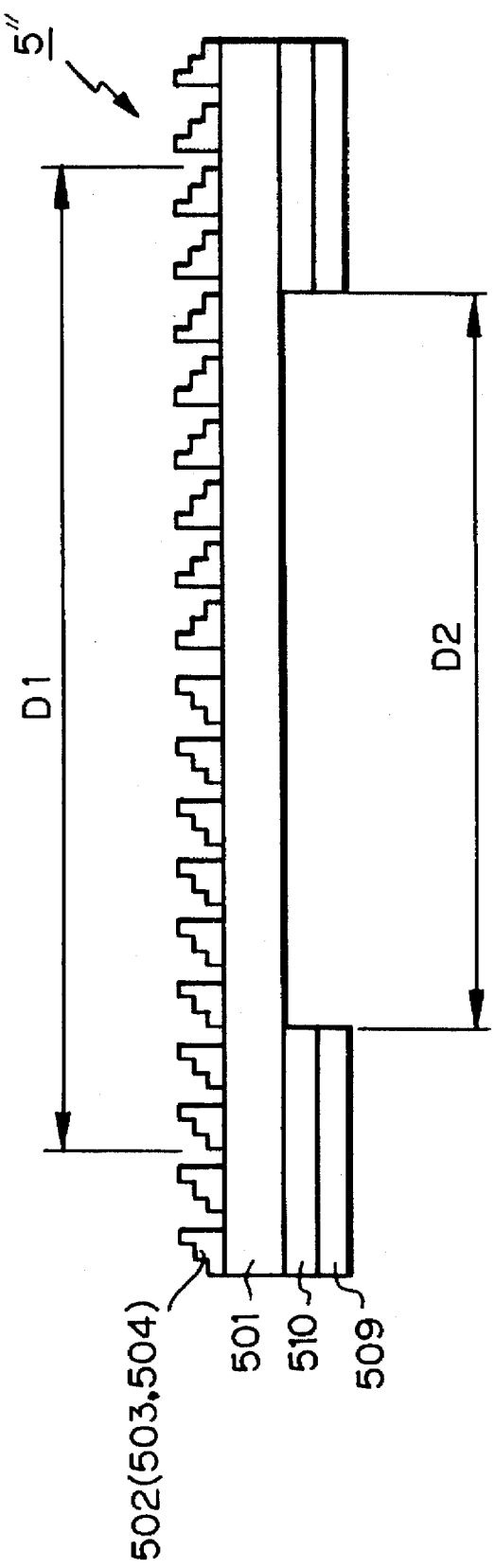
FIG. 9 is a cross-sectional view of the entire holographic optical element of FIG. 8.

In FIG. 9, which is a cross-sectional view of the entire holographic optical element 5" of FIG. 8 reference D1 designates an effective diameter of the objective lens 6". In this case, concentric interference fringes are provided on the entire area. Also, an interference filter layer 509 and a phase compensation layer 510 are provided only outside the area having diameter D2 smaller than the diameter D1. The interference filter layer 509 completely passes the 635 nm wavelength light therethrough, while the interference filter laye 509 completely reflects the 785 nm wavelength light. The phase compensation layer 510 adjusts a phase difference in between the 635 nm wavelength light passed through the interference filter layer 509 and the phase compensation layer 510 and the 635 nm wavelength light passed through the air, so that this phase difference is brought close to $2\pi$. Therefore, 81.8% of the 635 nm wavelength light is diffracted an the +1st order diffraction light by the inside of the area defined by the diameter D1. On the other hand, 99.5% of the 785 nm wavelength light passes through the inside of the area defined by the diameter D2, while the 785 nm wavelength light is completely reflected by the outside the area defined by the diameter D2. Note that, if a focal length f of the objective lens 6" is 2.6 mm and the diameters D1 and D2 are 1.56×2 mm and 1.17×2 mm, respectively, the effective numerical aperture for the 635 nm wavelength light is D1/2f=0.8 and the effective numerical aperture for the 785 nm wavelength light is D2/2f=0.45.

Note that the phase compensation layer 510 as well as the glass substrate 501 can be formed by one glass substrate. Also, the staircase portion (502, 503, 504) as well as the glass substrate 501 can be formed by one glass substrate as illustrated in FIG. 6B.

Further, the holographic optical element 5' or 5" of FIG. 5 or 8 can be formed directly on the objective lens 6' or 6" of FIGS. 5 or 8.

Figure 10A:
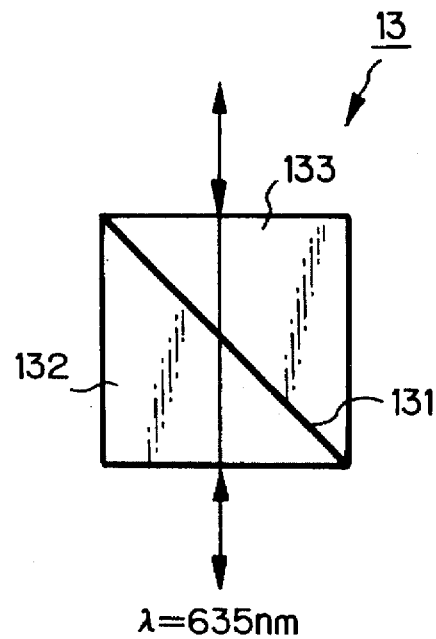
FIGS. 10A, 10B, 11A, 11B, 12A, 12B, 13A and 13B are diagrams of the interference filter of FIGS. 5 and 8.
Figure 10B:
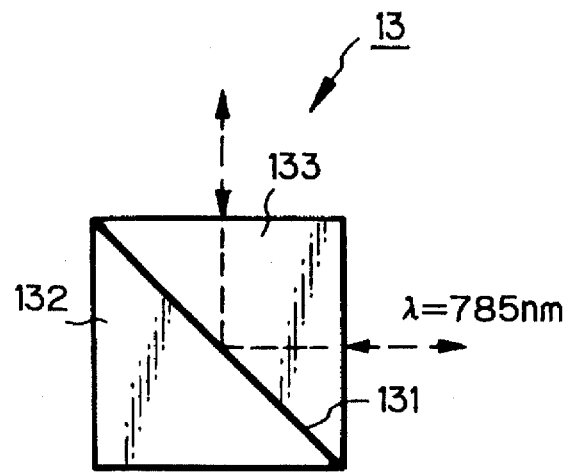

In FIGS. 10A and 10B, which are cross-sectional views of an example of the interference filter 13 of FIGS. 5 and 8, a dielectric multilayer film 131 is sandwiched by two glass blocks 132 and 133. As illustrated in FIG. 10A, the 635 nm wavelength light is incident at an angle of 45° to the dielectric multilayer film 131 and completely passes therethrough. On the other hand, as illustrated in FIG. 10B, the 785 nm wavelength light is incident at an angle of 45° to the dielectric multilayer film 131 and is completely reflected thereby.

Figure 11A:
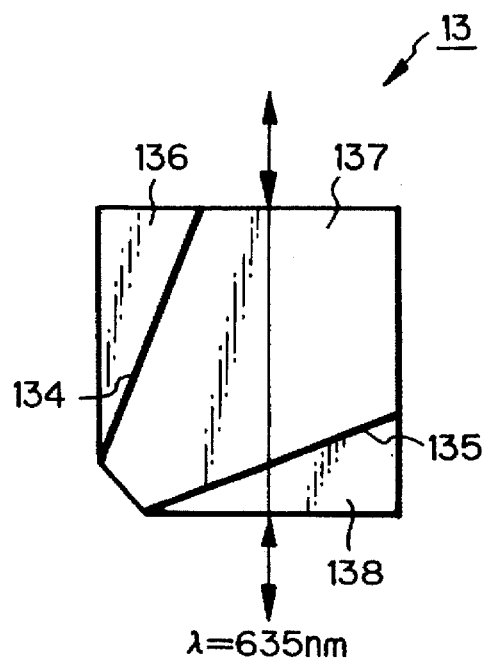
Figure 11B:
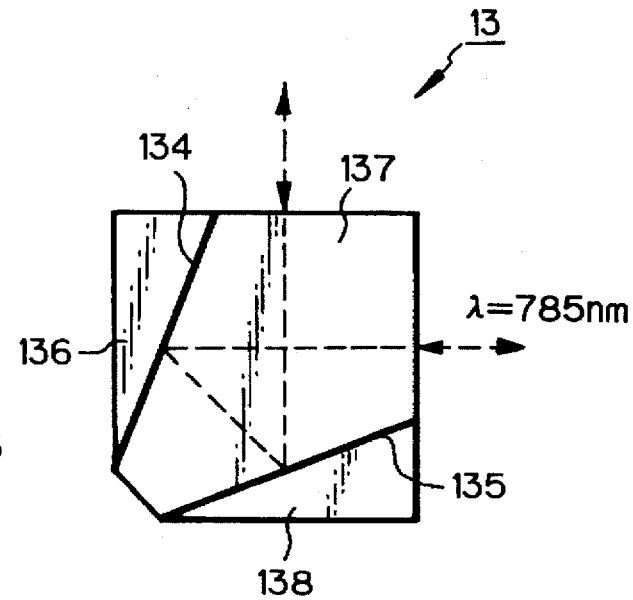

In FIGS. 11A and 11B, which are cross-sectional views of another example of the interference filter 13 of FIGS. 5 and 8, dielectric multilayers 134 and 135 are sandwiched by three glass blocks 136, 137 and 138. As illustrated in FIG. 11A, the 635 nm wavelength light is incident at an angle of 22.5° to the dielectric multilayer film 135 and completely passes therethrough. On the other hand, a illustrated in FIG. 11B, the 785 nm wavelength light is incident at an angle of 22.5° to the dielectric multilayer films 134 and 135 and is completely reflected thereby.

Figure 12A:
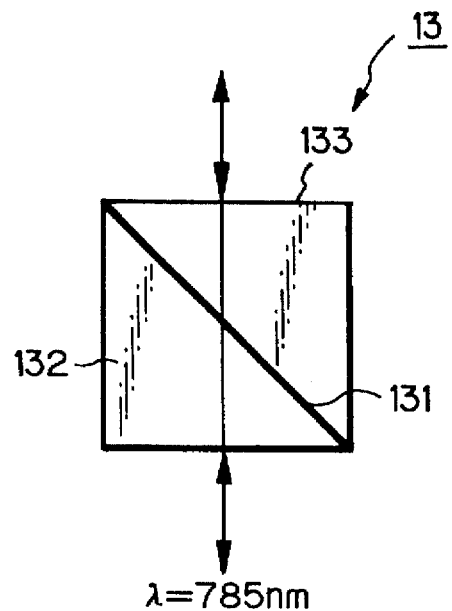
Figure 12B:
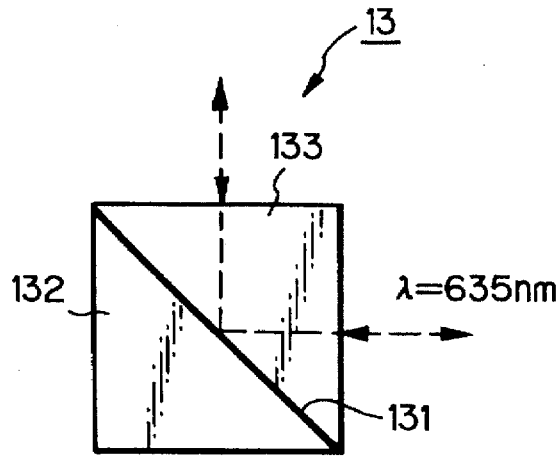
Figure 13A:
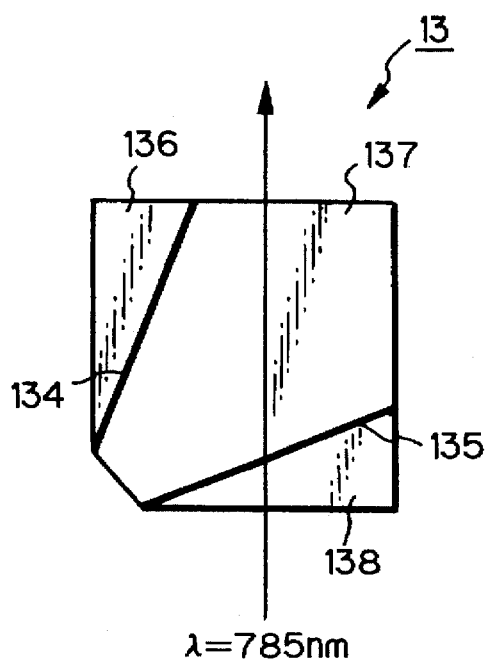
Figure 13B:
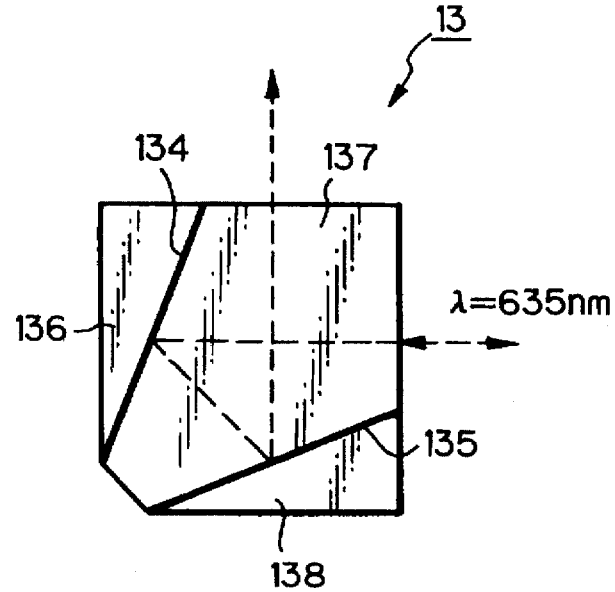

If the wavelength of the laser diode of the module 11 of FIGS. 5 and 8 is 785 nm and the wavelength of the laser diode of the module 12 of FIGS. 5 and 8 is 635 nm, the elements 131 through 138 of the interference filter 13 of FIGS. 10A and 10B are modified. In this case, the 785 nm wavelength light completely passes through the interference filter 13, while the 635 nm wavelength light is completely reflected by the interference filter 13 as shown in FIGS. 12A and 13B.

Note that, if the polarization direction of the outgoing light of the laser diode is the same as that of reflected light from the disk A or B, a polarizing beam splitter can be used instead of the interference filter 13. For example, the 635 nm wavelength light is incident as a P polarization light to the polarizing beam splitter, so that the 635 nm wavelength light completely passes therethrough. On the other hand, the 785 nm wavelength light is incident as an S polarization light to the polarizing beam splitter, so that the 785 nm wavelength light is completely reflected thereby.

A first example of the module 11(12) of FIGS. 5 and 8 is explained next with reference to FIGS. 14, 15A, 15B, 16A, 16B and 17. This module is suitable for a read-only disk.

Figure 14:
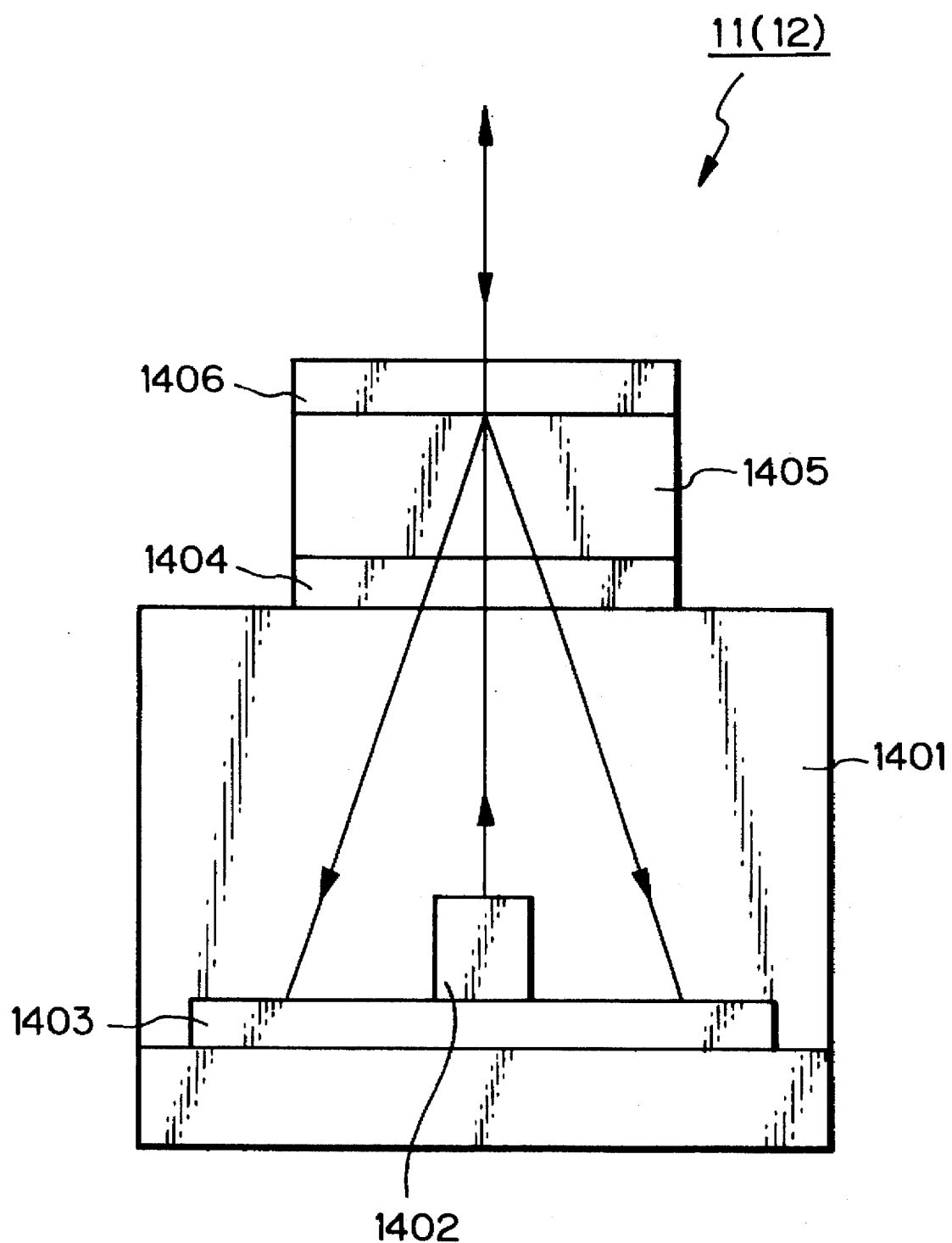
FIG. 14 is a detailed diagram of a first example of the module of FIGS. 5 and 8.

In FIG. 14, the module 11(12) includes a package 1401 containing a laser diode 1402 and a photodetector 1403. Also, provided on a window of the package 1401 are grating 1404, a spacer 1405 and a holographic optical element 1406. Note that each of the grating 1404 and the holographic optical element 1406 is formed by patterning silicon oxide on a glass substrate.

An outgoing light beam from the laser diode 1402 is split into a zeroth order light beam, (transmission light beam) a +1st order diffraction light beam and a −1st order diffraction light beam at the grating 1404. Then, about 50% of each of the transmission light beam, the +1st order diffraction light beam and the −1st order diffraction light beam passes through the holographic optical element 1406.

About 40% of an incoming light beam from the disk A or B is split into a +1st order diffraction light beam and a −1st order diffraction light beam at the holographic optical element 1406. The +1st order diffraction light beam and the −1st order diffraction light beam are incident to the photodetector 1403.

Figure 15A:
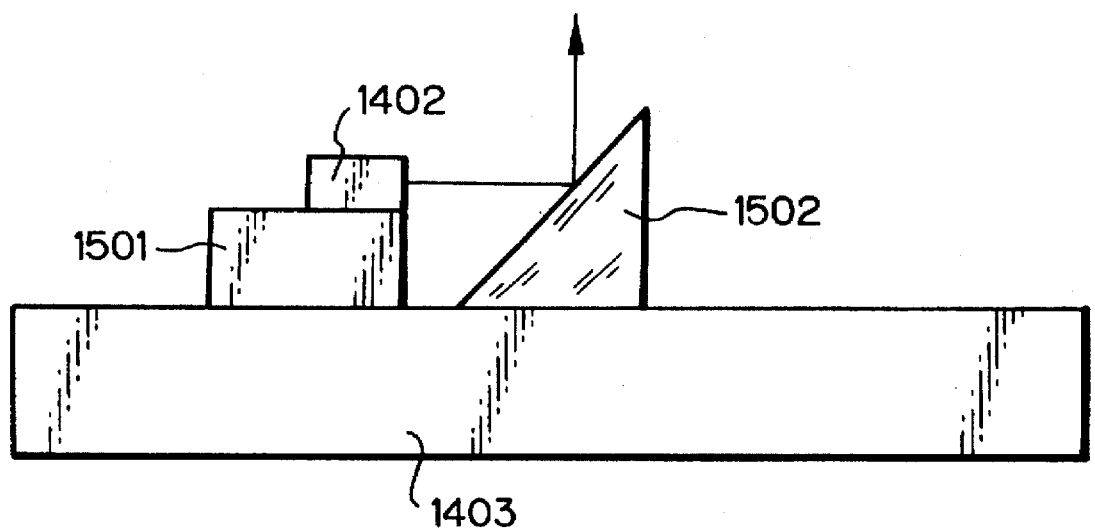
FIGS. 15A and 15B are enlarged diagrams of the laser diode and the photodetector of FIG. 14.

In FIG. 15A, which is an enlarged diagram of the laser diode 1402 and the photodetector 1403 of FIG. 14, the laser diode 1402 is mounted via a heat sink 1501 on the photodetector 1403. Also, a mirror 1502 is mounted on the photodetector 1403. Therefore, a light beam is emitted from the side of the laser diode 1402 and is reflected by the mirror 1502, so that the light beam outgoes upward.

Figure 15B:
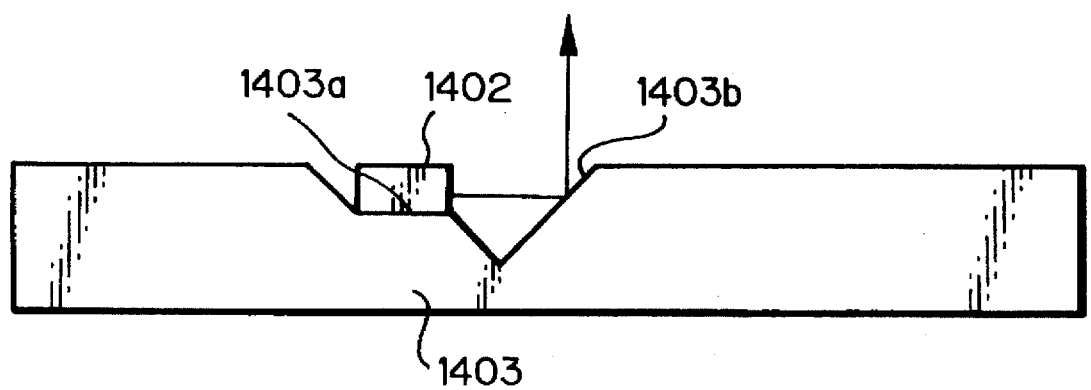

In FIG. 15B, which is also an enlarged diagram of the laser diode 1402 and the photodetector 1403 of FIG. 14, the laser diode 1402 is mounted in a recess 1403a of the photodetector 1403. Also, a mirror 1403b is formed by etching the photodetector 1403. Therefore, a light beam is emitted from the side of the laser diode 1402 and is reflected by the mirror 1403b, so that the light beam outgoes upward.

Figure 16A:
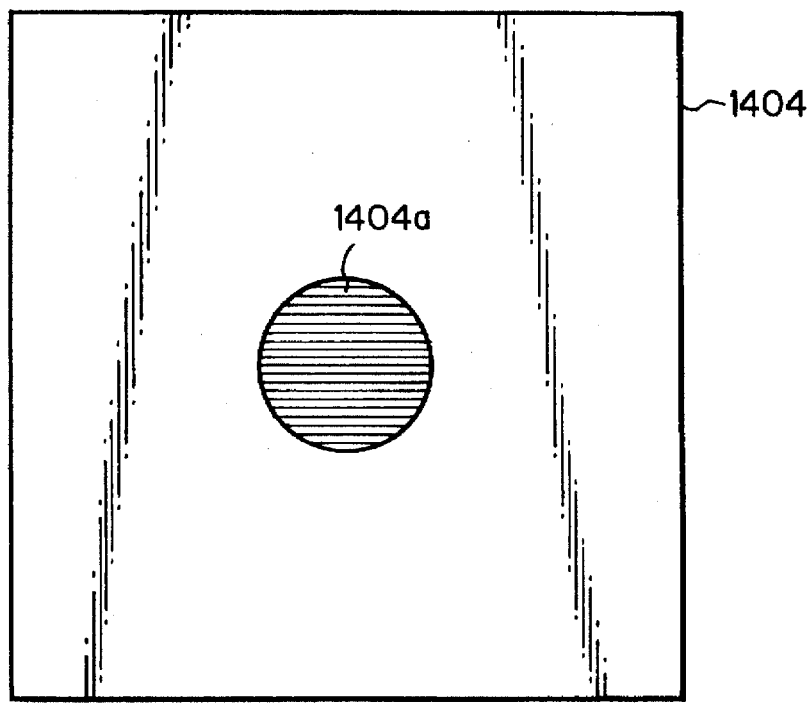
FIG. 16A is an enlarged plan view of the grating of FIG. 14.

In FIG. 16A, which is a plan view of the grating 1404 of FIG. 14, linear interference fringes are formed only on a central portion 1404a of the grating 1404. The outgoing light beam from the laser diode 1402 passes through an area inside the central portion 1404a, while the incoming light beam from the disk A or B passes through an area outside the central portion 1404a.

Figure 16B:
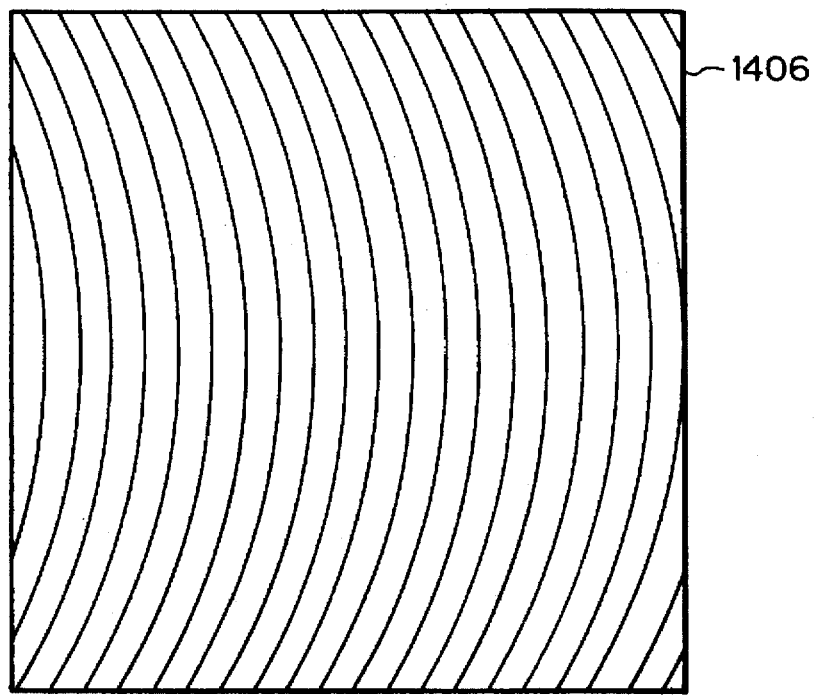
FIG. 16B is an enlarged plan view of the holographic optical element of FIG. 14.

In FIG. 16B, which is a plan view of the holographic optical element 1406 of FIG. 14, offaxial concentric interference fringes are formed on the entire surface. As a result, the holographic optical element 1406 serves as a convex lens for the +1st order diffraction light, and serves as a concave lens for the −1st order diffraction light.

Figure 17:
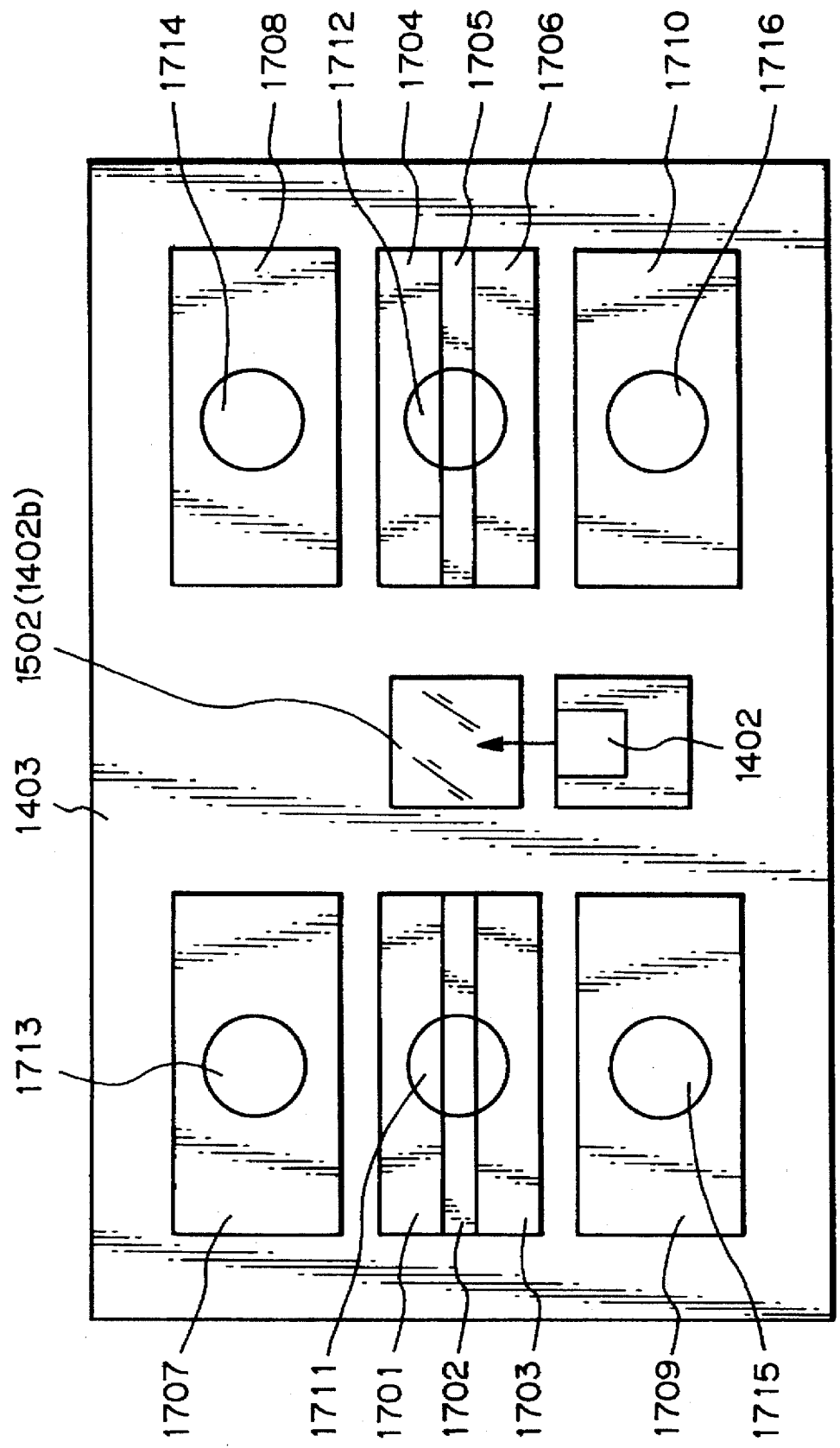
FIG. 17 is an enlarged plan view of the photodetector of FIG. 14.

In FIG. 17, which is an enlarged plan view of the photodetector 1407 of FIG. 14, reference numerals 1701 through 1710 designate photodetecting portions, and 1711 through 1716 designate beam spots. In this case, when the holographic optical element 1406 receives the outgoing zeroth order (transmission) light beam from the grating 1404, the incoming +1st order diffraction light beam from the holographic optical element 1406 forms the beam spot 1711, and the incoming −1st order diffraction light beam from the holographic optical element 1406 forms the beam spot 1712. Also, when the holographic optical element 1406 receives the outgoing +1st order light beam from the grating 1404, the incoming ±1st order diffraction light beams from the holographic optical element 1406 form the beam spots 1713 and 1714. Further, when the holographic optical element 1406 receives the outgoing −1st order diffraction light beam from the grating 1404, the incoming ±1st order diffraction light beams from the holographic optical element 1406 form the beam spots 1715 and 1716.

The photodetecting portions 1701, 1702, 1703, 1707 and 1709 are located at the backwardward of the focal points, while the photo/electric conversion portions 1704, 1705, 1706, 1708 and 1710 are located at the forward of the focal points.

In the photodetector 1403, a focusing error signal $V_f$ is calculated by using a known spot size method:

$$V_f = V(1701) + V(1703) + V(1705) - V(1702) - V(1704) - V(1706)$$

Also, a tracking error signal $V_t$ is calculated by using a known 3-beam method:

$$V_t = V(1707) + V(1708) - V(1709) - V(1710)$$

Further, an information signal $V_r$ is calculated by $$V_r = V(1701) + V(1702) + V(1703) + V(1704) + V(1705) + V(1706)$$

Here, V (1701), V (1702), ..., V (1710) are outputs of the photodetecting portions 1701, 1702, ..., 1710, respectively.

A second example of the module 11(12) of FIGS. 5 and 8 is explained next with reference to FIGS. 18, 19, 20 and 21. This module is suitable for a write-once type disk or a rewritable phase change disk.

Figure 18:
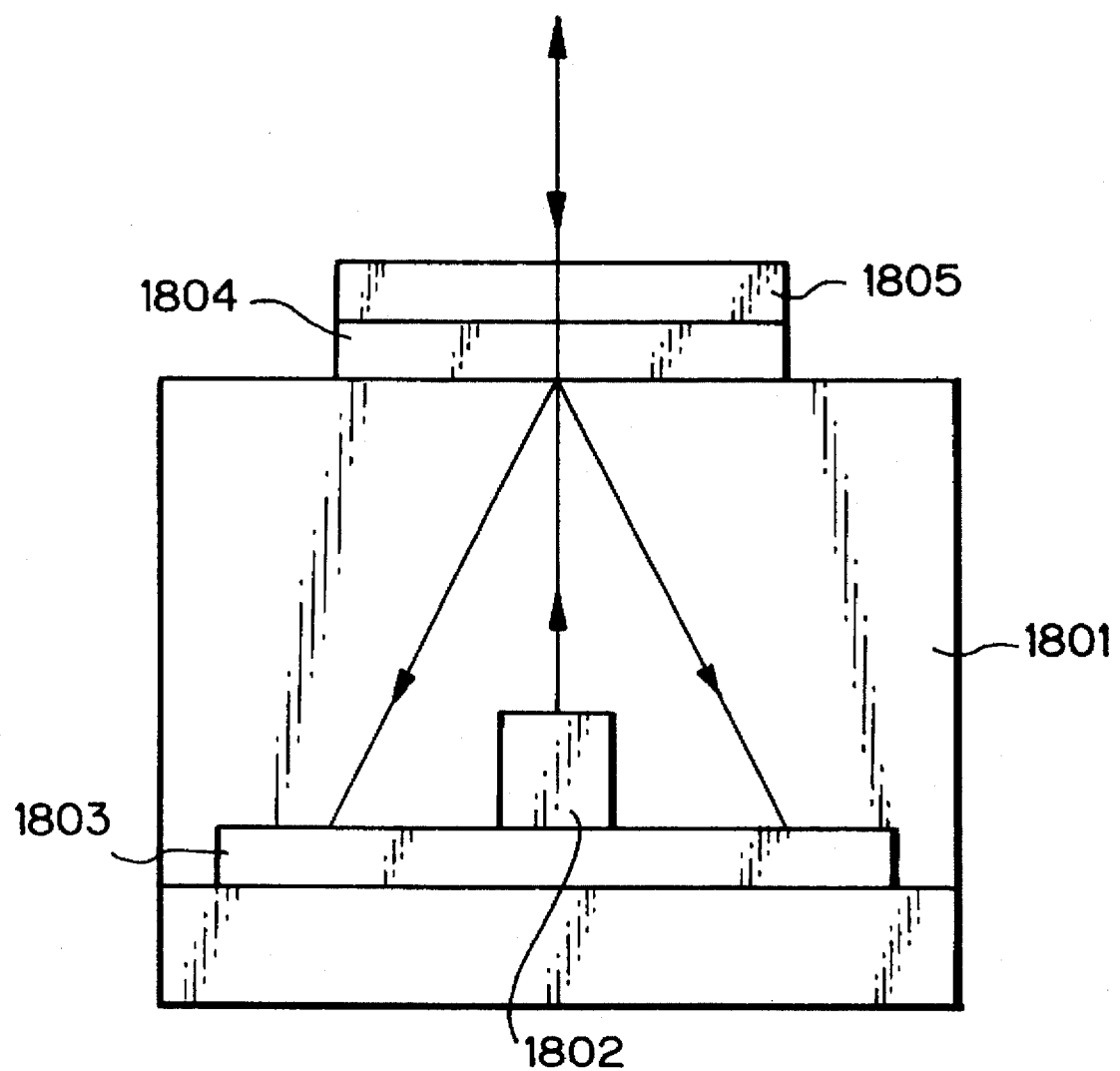
FIG. 18 is a detailed diagram of a second example of the module of FIGS. 5 and 8.

In FIG. 18, the module 11(12) includes a package 1801 containing a laser diode 1802 and a photodetector 1803. Also, provided on a window of the package 1801 are polarizing holographic optical element 1804 and a quarter wave plate 1805.

An ordinary light beam completely passes through the polarizing holographic optical element 1804, while an extraordinary light beam is completely diffracted by the polarizing holographic optical element 1804. Therefore, the outgoing light beam from the laser diode 1802 is incident to the polarizing holographic optical element 1804 as the ordinary light and completely passes therethrough, and then, the quarter wave plate 1805 converts a linearly polarizing light -to- a circularly polarizing light. The circularly polarizing light is incident to the disk A or B. Conversely, the quarter wave plate 1805 converts a circularly polarizing light -to- a linearly polarizing light, and then, the incoming light beam from the disk A or B is incident to the polarizing holographic optical element 1804 as an extraordinary light is completely diffracted thereby. As a result, about 80% of the abnormal light is diffracted as ±1st order diffraction light and is received by the photodetector 1803.

Figure 19:
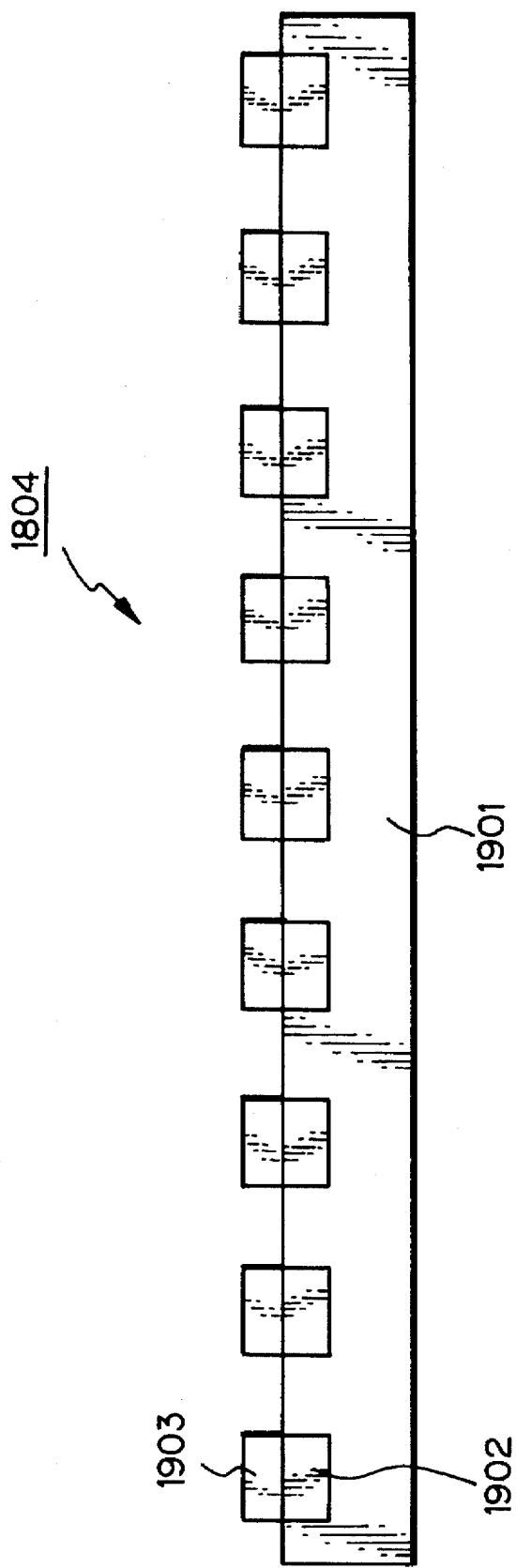
FIGS. 19 is an enlarged cross-sectional view of the polarizing holographic optical element of FIG. 18.

As illustrated in FIG. 19, which is a cross-sectional view of the polarizing holographic element 1804 of FIG. 18, the polarizing holographic optical element 1804 includes a lithium niobate substrate 1901 having a birefringent characteristics and a proton exchanged region 1902 and a phase compensation film 1903 on the substrate 1901.

Figure 20:
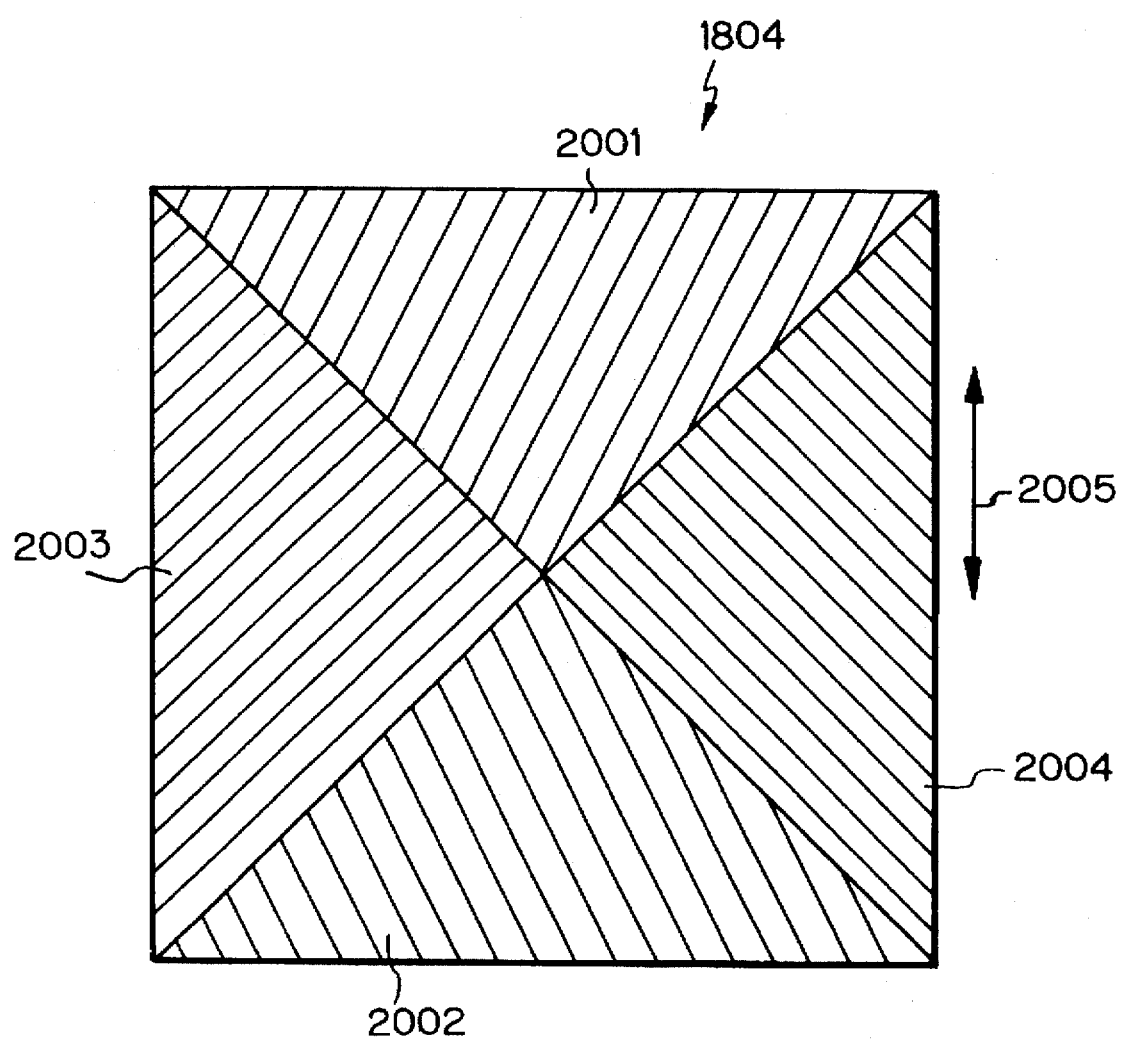
FIG. 20 is an enlarged plan view of the polarizing holographic optical element of FIG. 18.

Also, as illustrated in FIG. 20, which is a plan view of the polarizing holographic optical element 1804, interference fringes are split into four regions 2001, 2002, 2003 and 2004. Note that an optic axis 2005 is perpendicular to the direction of polarization of the outgoing light beam of the laser diode 1802.

Also, the laser diode 1802 is mounted on the photodetector 1803 in the same way as shown in FIG. 15A or 15B.

Figure 21:
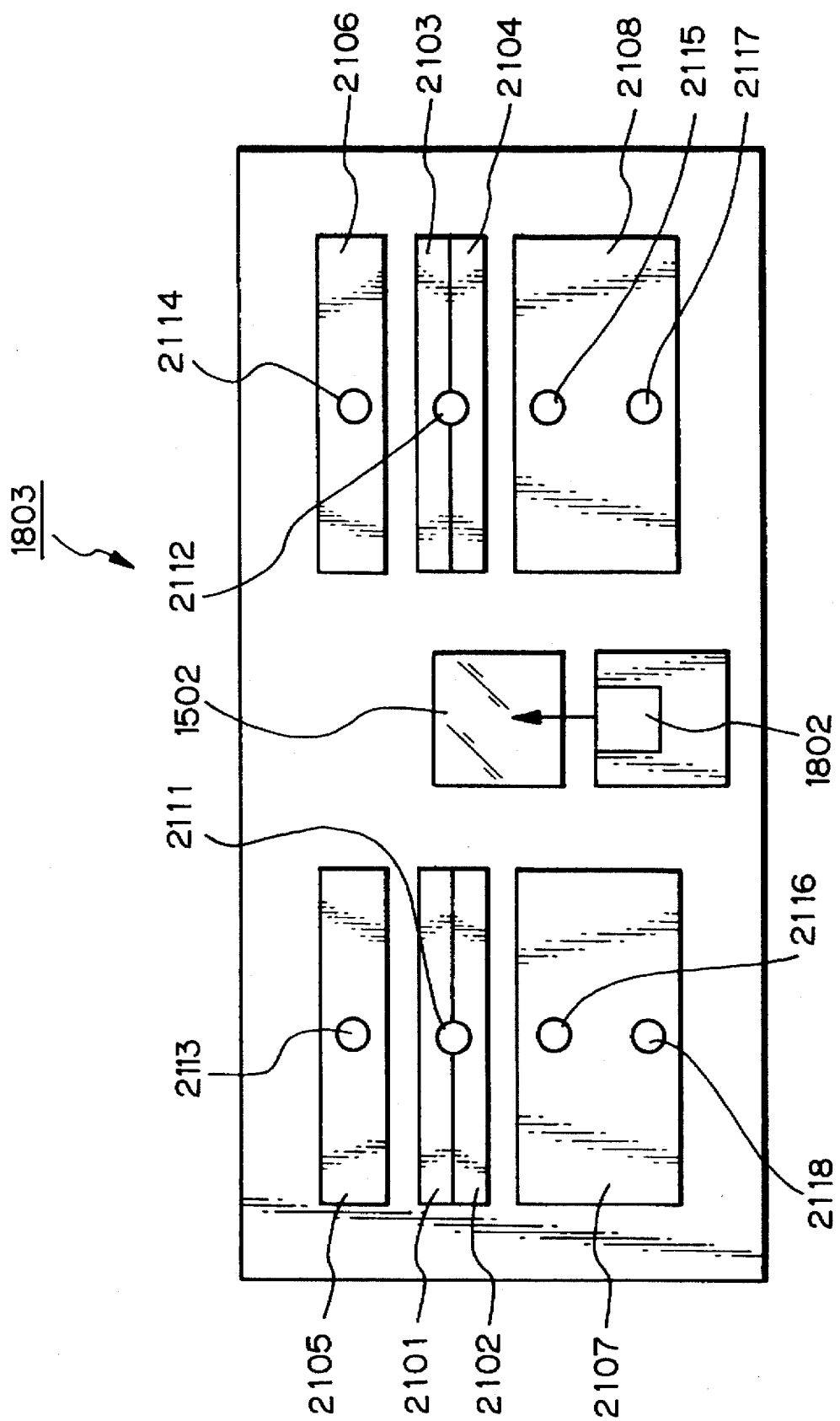
FIG. 21 is an enlarged plan view of the photodetector of FIG. 18.

In FIG. 21, which is an enlarged plan view of the photodetector 1803 of FIG. 18, reference numerals 2101 through 2108 designate photodetecting portions, and 2111 through 2118 designate beam spots. The +1st order diffraction light beam from the region 2001 forms the beam spot 2111, and the −1st order diffraction light beam from the area 2001 forms the beam spot 2115. Also, the +1st order diffraction light beam from the area 2002 forms the beam spot 2112, and the −1st order diffraction light beam from the area 2002 forms the beam spot 2116. Further, the ±1st order diffraction light beams from the region 2003 form the beam spots 2113 and 2117, and the ±1st order diffraction light beams from the region 2004 form the beam spots 2114 and 2118.

In the photodetector 1803, a focus error signal $V_f$ is calculated by using a known Foucault method:

$$V_f = V(2101) + V(2104) - V(2102) - V(2103)$$

Also, a track error signal $V_t$ is calculated by using a known push-pull method:

$$V_t = V(2105) - V(2106)$$

Further, an information signal $V_r$ is calculated by $$V_r = V(2107) + V(2108)$$

Here, V (2101), V (2102), ..., V (2108) are outputs of the photodetecting portions 2101, 2102, ..., 2108, respectively.

A third example of the module 11(12) of FIGS. 5 and 8 is explained next with reference to FIGS. 22, 23A, 23B 24 and 25. This module is suitable for a rewritable magneto-optical disk.

Figure 22:
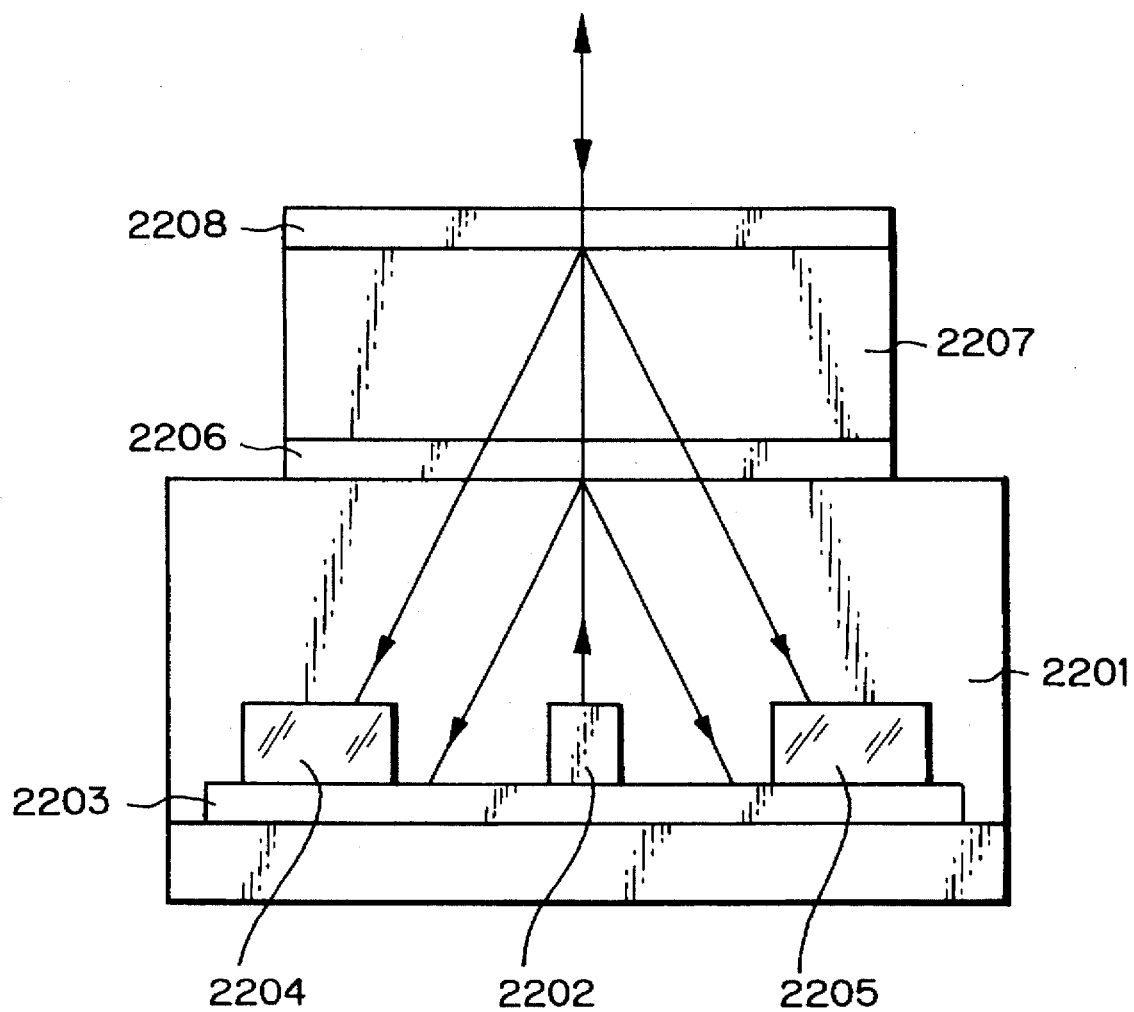
FIG. 22 is a detailed diagram of a third example of the module of FIGS. 5 and 8.

In FIG. 22, the module 11(12) includes a package 2201 containing a laser diode 2202, a photodetector 2203, and microprisms 2204 and 2205. Also, provided on a window of the package 2201 are a holographic optical element 2206, a spacer 2207 and a polarizing grating 2208.

The polarizing grating 2208 has the same configuration as the polarizing homographic optical element 1804 of FIGS. 18, 19 and 20. That is, an ordinary light beam partly passes through the polarizing holographic grating 2208, while an extraordinary light beam is completely diffracted by the polarizing grating 2208. Therefore, about 80% of the outgoing light beam from the laser diode 2202 passes through the holographic optical element 2206, to reach the polarizing grating 2208 as the ordinary light. Then, about 90% of the light passes through the polarizing grating 2208 to reach the disk A or B. Conversely, about 8% of the ordinary component and about 80% of the extraordinary component of the light reflected by the disk A or B are diffracted by the polarizing grating as the ±1st order diffraction light. Then, the +1st order diffraction light is received via the microprism 2204 by the photodetector 2203, and the −1st order diffraction light is received via the microprism 2205 by the photodetector 2203. Also, about 20% of the ordinary component of the light reflected by the disk A or B passes through the polarizing grating 2208, to reach the holographic optical element 2206. Then, about 10% of the light is diffracted as the ±1st order diffraction light and is received by the photodetector 2203.

Figure 23A:
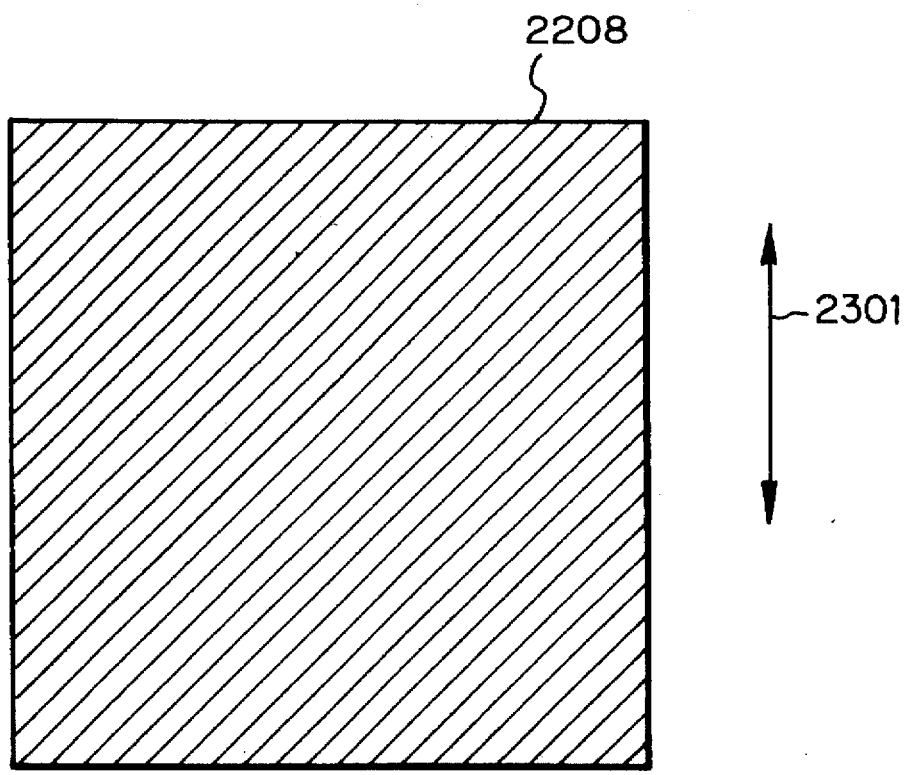
FIG. 23A is an enlarged plan view of the polarizing grating of FIG. 22.

In FIG. 23A, which is a plan view of the polarizing grating 2208 of FIG. 22, an opticl oxis 2301 is perpendicular to the direction of polarization of the outgoing light beam of the laser diode 2202.

Figure 23B:
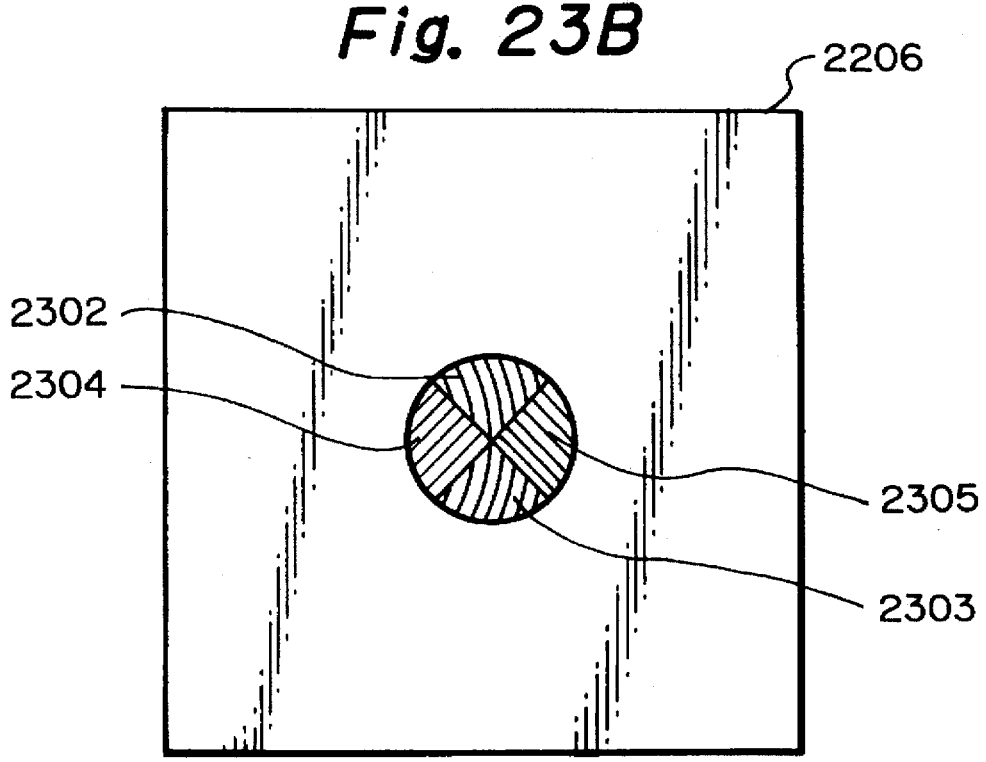
FIG. 23B is an enlarged plan view of the holographic optical element of FIG. 22.

In FIG. 23B, which is a plan view of the holographic optical element 2206 of FIG. 22, interference fringes are formed only on a central portion of the holographic optical element 2206. Also, the interference fringes are split into four region 2302, 2303, 2304 and 2305.

The light reflected by the disk A or B is incident to the polarizing grating 2208 which generates a zeroth order (transmission) light beam and ±1st order diffraction light beam. Then, the transmission light beam passes through the area inside the interference fringe regions 2302 to 2305, while the ±1st order diffraction light beam passes through the area outside of the interference fringe regions 2302 to 2305.

In FIG. 23B, note that the interference fringes in the regions 2302 and 2303 have an offaxial concentric pattern. As a result, the areas 2302 and 2303 serve as a convex lens for the +1st order diffraction light, and serve as a concave lean for the −1st order diffraction light.

Figure 24:
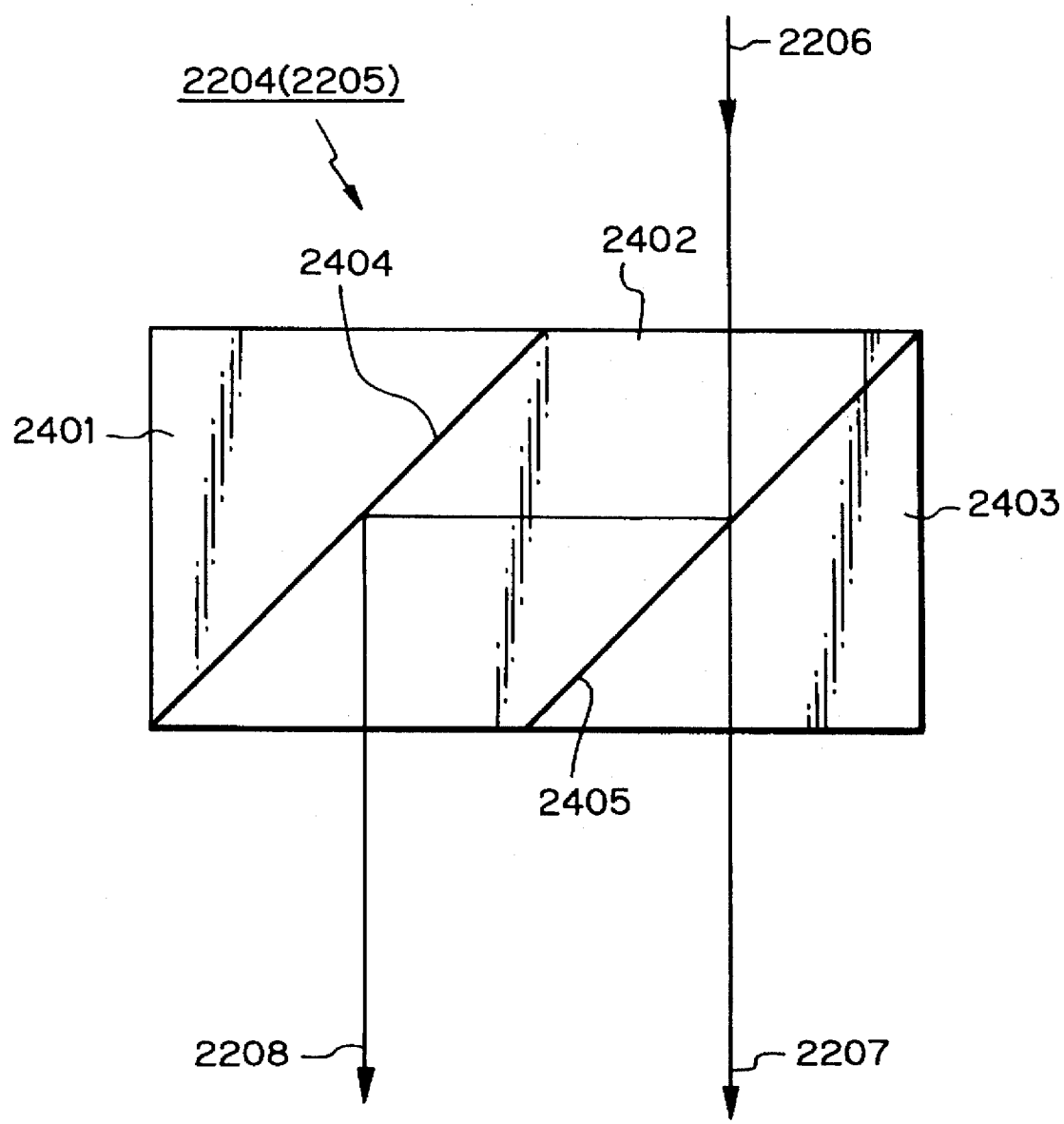
FIG. 24 is a cross-sectional view of the microprism of FIG. 22.

In FIG. 24, which is a cross-sectional view of the microprism 2204 (2205) of FIG. 22, three glass blocks 2401, 2402 and 2403 are adhered by two dielectric multilayer flims 2404 and 2405. As a result, a P polarization component of an incident light beam 2206 completely passes through the dielectric multilayer film 2408, so that a transmission light beam 2207 is obtained. On the other hand, an S polarization component of the incident light beam 2206 is completely reflected twice the dielectric multilayer films 2405 and 2404, so that a reflection light beam 2208 is obtained.

Figure 25:
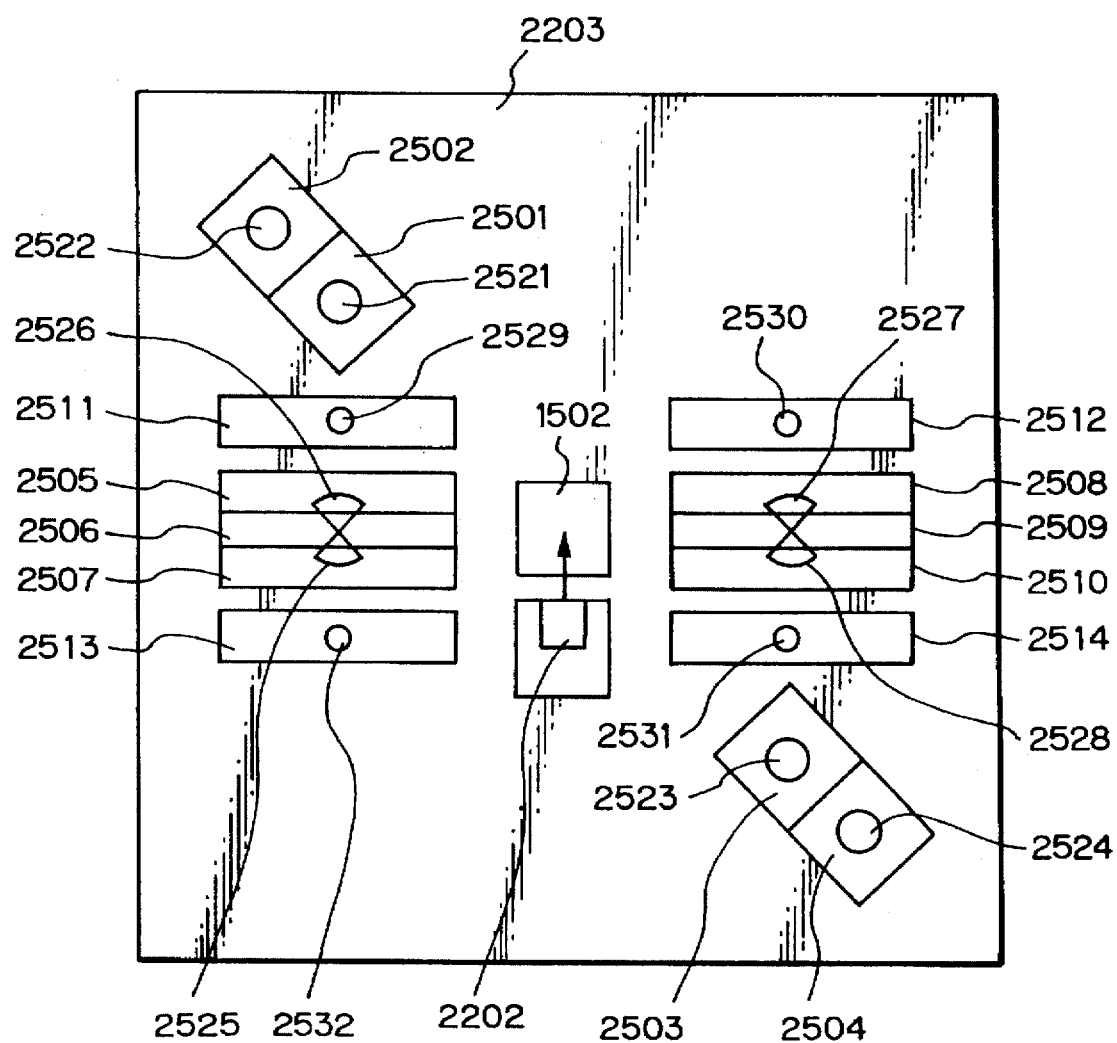
FIG. 25 is an enlarged plan view of the photodetector of FIG. 22.

In FIG. 25, which is an enlarged plan view of the photodetector 2203 of FIG. 22, reference numerals 2501 through 2514 designate photodetecting portions, and 2521 through 2532 designate beam spots.

The +1st order diffraction light beam from the polarizing grating 2208 is split at the microprism 2204 into a transmission light beam and a reflection light beam, so that the transmission light beam forms the beam spot 2521 and the reflection light beam forms the beam spot 2522. Also, the −1st order diffraction light beam from the polarizing grating 2208 is split at the microprism 2205 into a transmission light beam and a reflection light beam, so that the transmission light beam forms the beam spot 2523 and the reflection light beam forms the beam spot 2524.

On the other hand, the +1st order diffraction light beam from the regions 2302 and 2303 of the holographic optical element 2206 form the beam spots 2525 and 2526, and the −1st order diffraction light beam from the regions 2302 and 2303 of the holographic optical element 2206 form the beam spots 2527 and 2528. Note that the photodetecting portions 2505, 2506 and 2507 are located at the backward of the focal points, while the pohto/electro conversion portions 2508, 2509 and 2510 are located at the forward of the focal points.

Further, the ±1st order diffraction light beams from the region 2304 of the holographic optical element 2206 form the beam spots 2529 and 2531, and the ±1st order diffraction light beams from the area 2305 of the holographic optical element 2206 form the beam spots 2530 and 2532.

In the photodetector 2203, a focusing error signal $V_f$ is calculated by using a known spot size method:

$$V_f = V(2505) + V(2507) + V(2509) - V(2506) - V(2508) - V(2510)$$

Also, a tracking error signal $V_t$ is calculated by using a known push-pull method:

$$V_t = V(2511) + V(2514) - V(2512) - V(2513)$$

Further, an information signal $V_i$ is calculated by $$V_i = V(2501) + V(2503) - V(2502) - V(2504)$$

Here, V (2501), V (2502), . . . , V (2514) are outputs of the photodetecting portions 2501, 2502, . . . , 2514, respectively.

Figure 26:
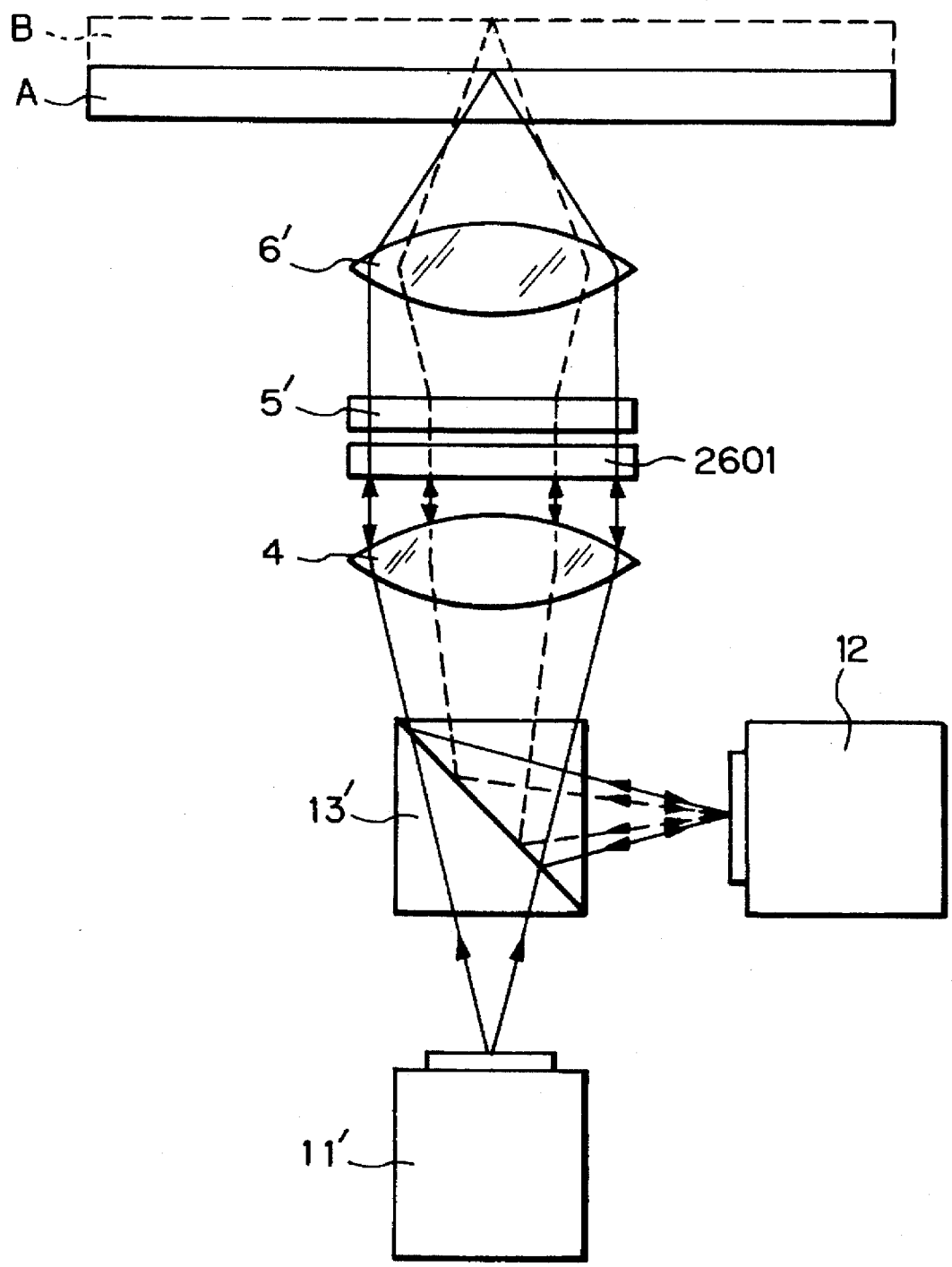
FIG. 26 is a diagram illustrating a third embodiment of the optical head apparatus according to the present invention.

In FIG. 26, which illustrates a third embodiment of the present invention, a laser diode 11' for a 635 nm wavelength light beam is provided instead of the module 11 of FIG. 5, and the interference filter 13 of FIG. 5 is modified into an interference filter 13'. Also, a quarter wave plate 2601 is added to the elements of the apparatus of FIG. 5. A 635 nm wavelength P polarization light beam completely passes through the interference filter 13', while a 635 nm wavelength S polarization light beam and a 785 nm wavelength light beam are completely reflected by the interference filter 13'. Also, the quarter wave plate 2601 is optimized for the 635 nm wavelength light beam.

The 635 nm wavelength light beam emitted from the laser diode 11' completely passes through the interference filter 13' as a P polarization light beam and is incident to the collimator lens 4 which generates a collimated light beam. Then, the quarter wave plate 2601 converts a linearly polarizing light-to-circularly polarizing light. Then, the circularly polarizing light is incident to the holographic optical element 5'. Then, the transmission light beam of the holographic optical element 5' is incident to the objective lens 6', and then, is focused at the disk A. A reflected light beam from the disk A is again incident via the objective lens 6' to the holographic optical element 5' and passes therethrough. Then, the quarter wave plate 2601 converts a circularly polarizing light-to- alinearly polarizing light. The output of the quarter wave plate 2601 is incident as a collimated light beam to the collimator lens 4. The transmission light beam of the collimator lens 4 is incident as an S polarization light beam to the interference filter 13'. Thus, the S polarization light beam is completely reflected by the interference filter 13' and is received by the photodetector of the module 12.

On the other hand, the 785 nm wavelength light beam emitted from the laser diode of the module 12 is completely reflected by the interference filter 13' and is incident to the collimator lens 4 which generates a collimated light beam. Then, the quarter wave plate 2601 converts a linearly polarizing light-to-elliptically polarizing light. Then, the elliptically polarizing light is incident to the holographic optical element 5'. Then, the −1st order diffraction light beam of the holographic optical element 5' is incident as a divergent light beam to the objective lens 6', and then, is focused at the disk B. A reflected light beam from the disk B is again incident via the objective lens 6' to the holographic optical element 5' and is diffracted thereby. Then, the ¼ interference filter 2601 converts an elliptically polarizing light-to-elliptically polarizing light. The output of the quarter wave plate 2601 is incident as a collimated light beam to the collimator lens 4. The transmission light beam of the collimator lens 4 is incident to the interference filter 13', and is completely reflected by the interference filter 13'. Thus, the light is received by the photodetector of the module 12.

Figure 27:
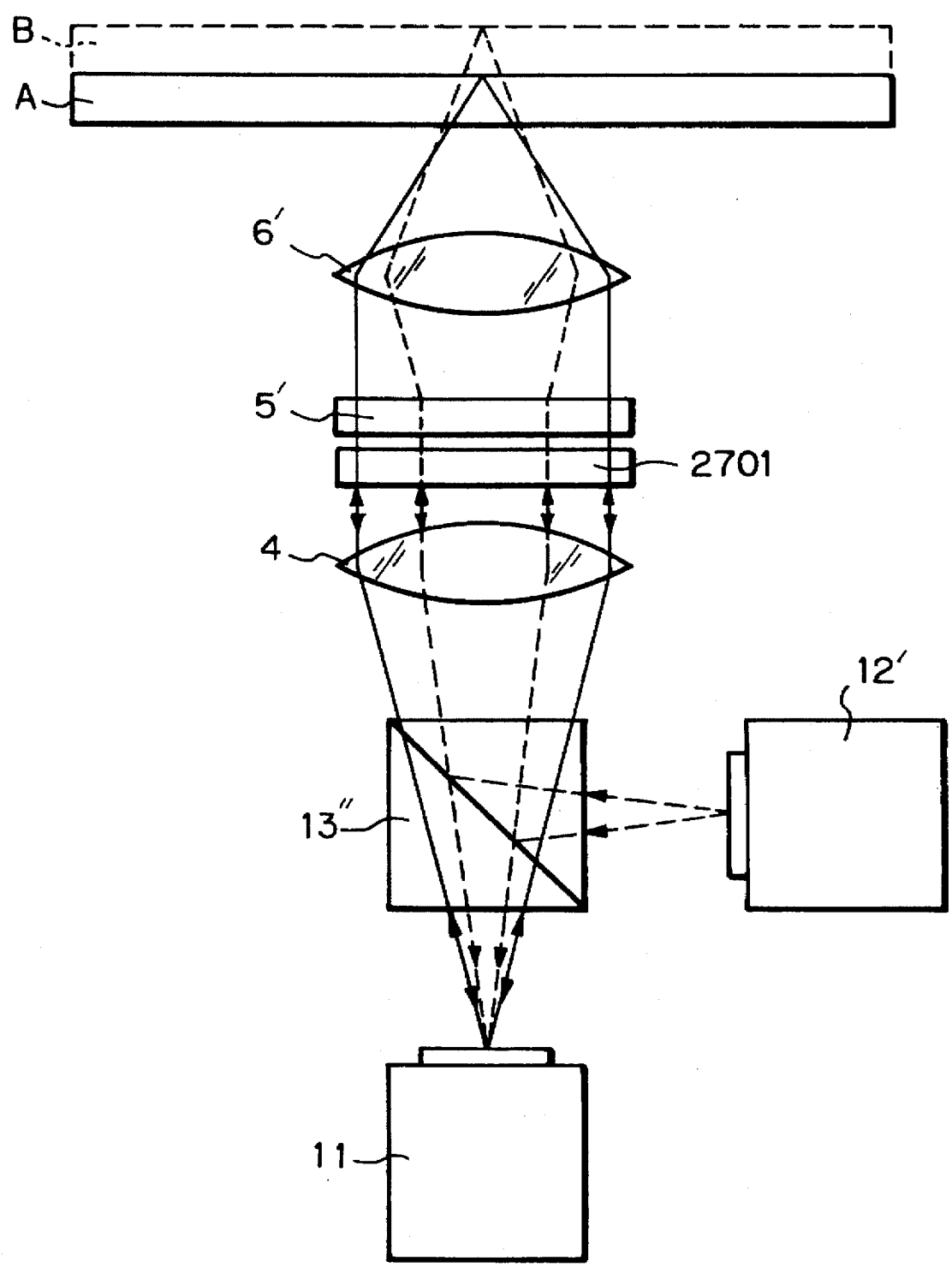
FIG. 27 is a diagram illustrating a fourth embodiment of the optical head apparatus according to the present invention.

In FIG. 27, which illustrates a fourth embodiment of the present invention, a laser diode 12' for a 785 nm wavelength light beam is provided instead of the module 12 of FIG. 5, and the interference filter 13 of FIG. 5 is modified into an interference filter 13". Also, a quarter wave plate 2701 is added to the elements of the apparatus of FIG. 5. A 635 nm light beam and a 785 nm wavelength P polarization light beam completely passes through the interference filter 13", while a 785 nm wavelength S polarization light beam is completely reflected by the interference filter 13". Also, the quarter wave plate 2701 is optimized for the 785 nm wavelength light beam.

The 635 nm wavelength light beam emitted from the laser diode of the module 11 completely passes through the interference filter 13" and is incident to the collimator lens 4 which generates a collimated light beam. Then, the quarter wave plate 2701 converts a linearly polarizing light-to-elliptically polarizing light. Then, the elliptically polarizing light is incident to the holographic optical element 5'. Then, the transmission light beam of the holographic optical element 5' is incident to the objective lens 6', and then, is focused at the disk A. A reflected light beam from the disk A is again incident via the objective lens 6' to the holographic optical element 5'. Then, the quarter wave plate 2701 converts an elliptically polarizing light-to-linearly polarizing light. The output of the quarter wave plate 2701 is incident as a collimated light beam to the collimator lens 4. The transmission light beam of the collimator lens 4 is incident to the interference filter 13", and then, completely passes through the interference filter 13". Thus, the light is received by the photodetector of the module 11.

On the other hand, the 785 nm wavelength light beam emitted from the laser diode 12' is reflected by the interference filter 13" as an S polarization light beam and is incident to the collimator lens 4 which generates a collimated light beam. The quarter wave plate 2701 converts a linearly polarizing light-to-circularly polarizing light. Then, the circularly polarizing light is incident to the holographic optical element 5'. Then, the −1st order diffraction light beam of the holographic optical element 5' is incident as a divergent light beam to the objective lens 6', and then, is focused at the disk B. A reflected light beam from the disk B is again incident via the objective lens 6' to the holographic optical element 5' and is diffracted thereby. Then, the quarter wave plate 2701 converts a circularly polarizing light-to-linearly polarizing light. The output of the quarter wave plate 2701 is incident as a collimated light beam to the collimator lens 4. The transmission light beam of the collimator lens 4 is incident as a P polarization light beam to the interference filter 13". Thus, the P polarization light beam completely passes through the interference filter 13" and is received by the photodetector of the module 11.

Although the third and fourth embodiments are modifications of the first embodiment, the same modifications can be made in the second embodiment.

Figure 28:
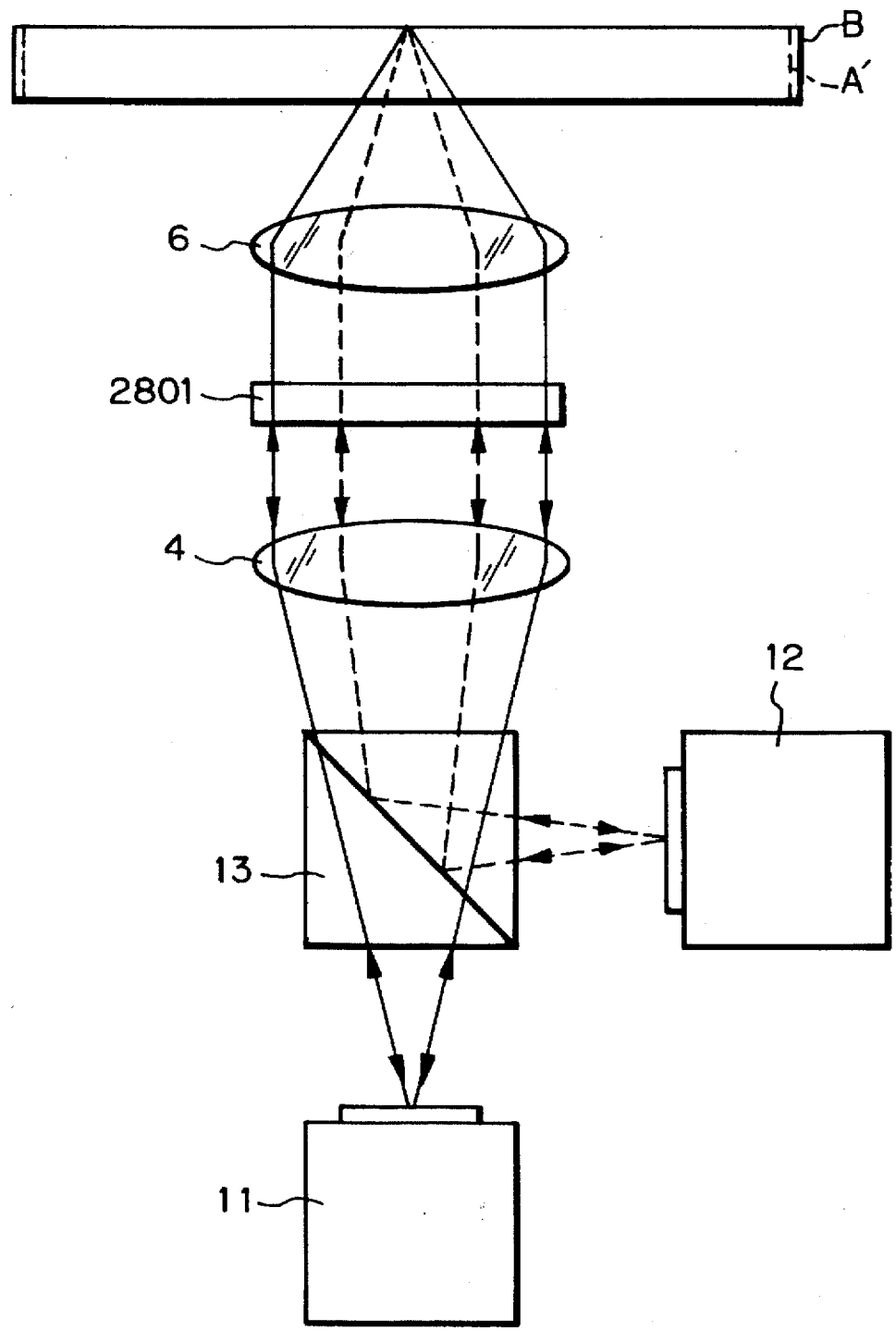
FIG. 28 is a diagram illustrating a fifth embodiment of the optical head apparatus according to the present invention.

In FIG. 28, which illustrates a fifth embodiment of the present invention, an aperture limiting element 2801 is provided instead of the holographic optical element 5' of FIG. 5. In this case, there are prepared two types of disks, a high density thick disk A' and a low density thick disk B having the same thickness as illustrated in FIG. 4.

A 635 nm wavelength light beam emitted from the laser diode of the module 11 completely passes through the interference filter 13 and is incident to the collimator lens 4 which generates a collimated light beam. The collimated light beam passes through the entire aperture limiting element 2801 to reach the objective lens 6. Then, the light beam passes through the objective lens 6 and is focused at the disk A'. A reflected light beam from the disk A' is again incident via the objective lens 6 to the aperture limiting element 2801. Then, the light beam passes through the aperture limiting element 2801 and the collimator lens 4 to reach the interference filter 13. Further, the light beam completely passes through the interference filter 13 and is received by the photodetector of the module 11.

Thus, an effective numerical aperture for the 635 nm wavelength light beam is dependent upon the diameter and focal length of the objective lens 6.

On the other hand, a 785 nm wavelength light beam emitted from the laser diode of the module 12 is completely reflected by the interference filter 13 and is incident to the collimator lens 4 which generates a collimated light beam. The collimated light beam passes through only a central portion of the aperture limiting element 2801 to reach the objective lens 6. Then, the light beam passes through the objective lens 6 and is focused at the disk B. A reflected light beam from the disk B is again incident via the objective lens 6 to the aperture limiting element 2801. Then, the light beam passes through only the central portion of the aperture limiting element 2601 and the collimator lens 4 to reach the interference filter 13. Further, the light beam is completely reflected by the interference filter 13 and is received by the photodetector of the module 12.

Thus, an effective mumerical aperture for the 765 nm wavelength light beam is dependent upon the diameter of the effective central portion of the aperture limiting element 2801 and the focal length of the objective lens 6.

Figure 29A:
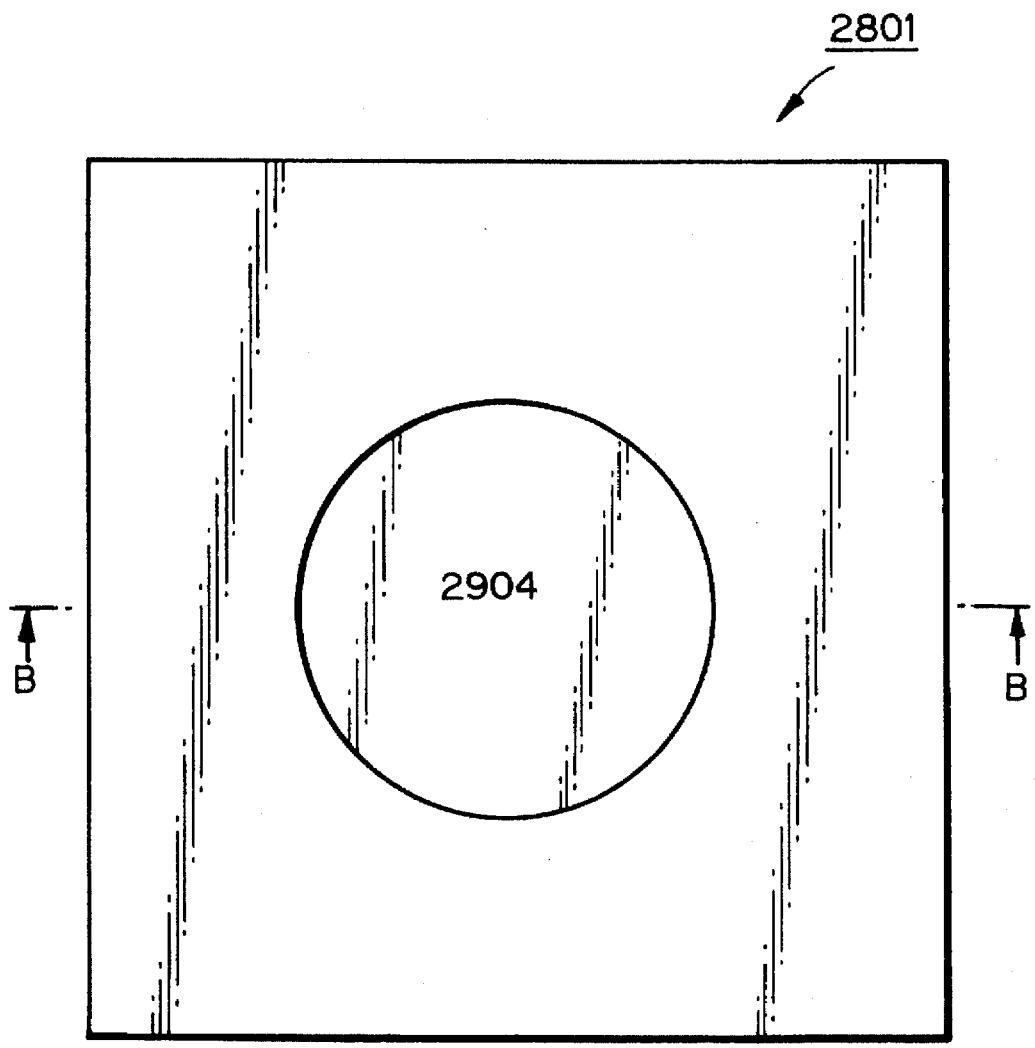
FIG. 29A is a plan view of a first example of the aperture limiting element of FIG. 28.
Figure 29B:
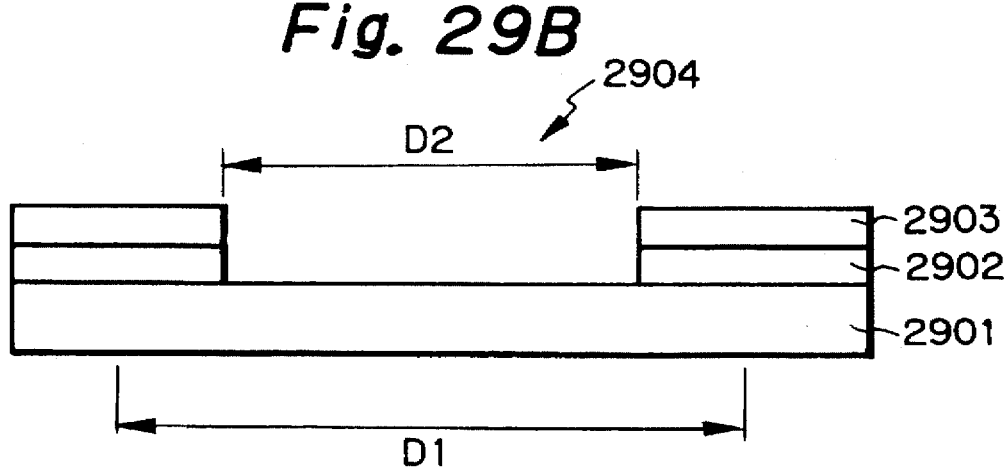
FIG. 29B is a cross-sectional view taken along the line B—B of FIG. 29A.

FIG. 29A is a plan view of a first example of the aperture limiting element 2801 of FIG. 28, and FIG. 29B is a cross-sectional view taken along the line B—B of FIG. 29A. Reference numeral 2901 designates a glass substrate on which an interference filter layer 2902 and a phase compensation layer 2903 are formed. Also, an aperture 2904 is perforated in the interference filter layer 2902 and the phase compensation layer 2903. In this case, a diameter D2 of the aperture 2904 is smaller than an effective diameter D1 of the objective lens 6. The interference filter layer 2902 completely passes the 635 nm wavelength light therethrough, while the interference filter layer 2902 completely reflects the 785 nm wavelength light thereby. The phase compensation layer 2903 adjusts a phase difference between the 635 nm wavelength light through the interference filter layer 2902 and the phase compensation layer 2903 and the 635 nm wavelength light passed through the air so that this phase difference is brought close to $2\pi$. That is, in the outside of the aperture 2904, the 635 nm wavelength light completely passes through the aperture limiting element 2801, and the 785 nm wavelength light is completely reflected by the aperture limiting element 2801. On the other hand, in the inside of the aperture 2904, both the 635 nm wavelength light and the 785 nm wavelength light completely pass through the aperture limiting element 2801.

The interference filter layer 2902 can be formed by an alternately stacked configuration of an odd number of high refractive index layers made of $TiO_2$, for example, and an even number of low refractive index layers made of $SiO_2$, for example. In order to obtain a high wavelength selection characteristics, the following formulae should be satisfied:

$n_1 \cdot d_1 = n_1 \cdot d_2 = \lambda/4$ where $n_1$ is a refractive index of the high refractive index layer;

$n_2$ is a refractive index of the low refractive index layer;

$d_1$ is a thickness of the high refractive index layer;

$d_2$ is a thickness of the low refractive index layer; and $\lambda$ is 785 nm.

For example, if the high refractive index layers are made of $TiO_2$ and the low refractive index layers are made of $SiO_2$, $n_1 = 2.30$ and $n_2 = 1.46$, so that $d_1 = 85$ nm and $d_2 = 134$ nm.

The phase compensation layer 2903 can be made of $SiO_2$.

Figure 30A:
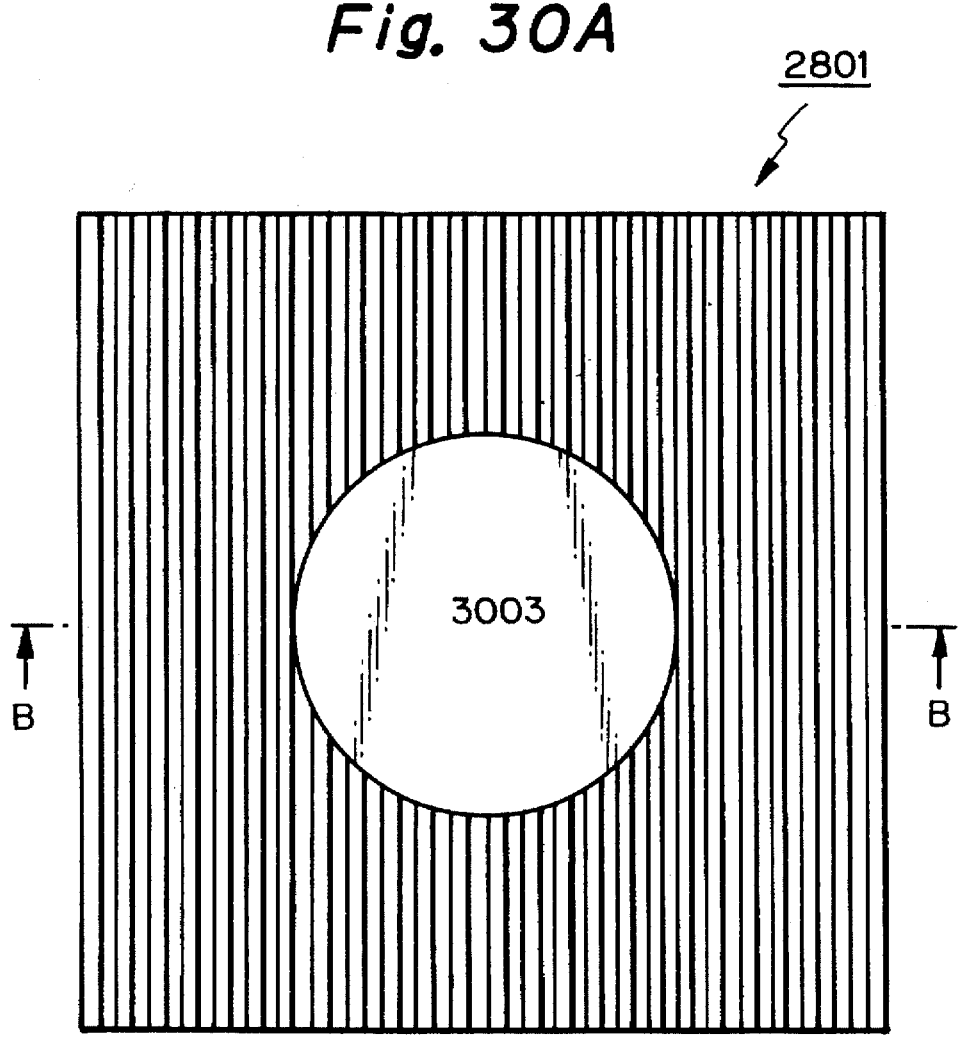
FIG. 30A is a plan view of a second example of the aperture limiting element of FIG. 28.
Figure 30B:
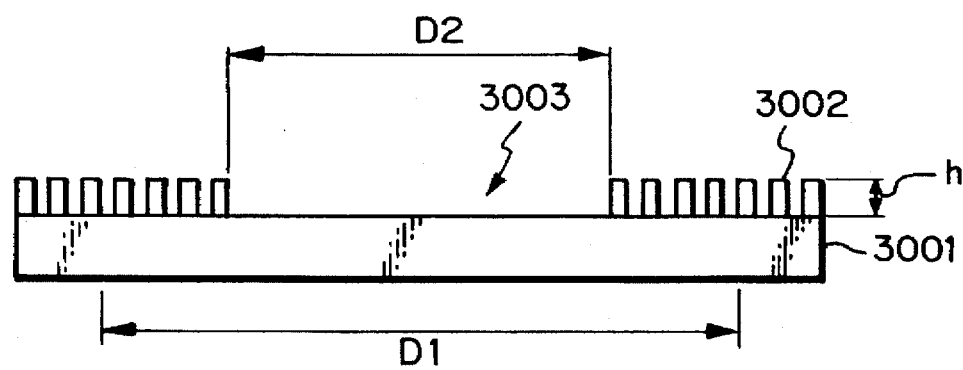
FIG. 30B is a cross-sectional view taken along the line B—B of FIG. 30A.

FIG. 30A is a plan view of a second example of the aperture limiting element 2801 of FIG. 28, and FIG. 30B is a cross-sectional view taken along the line B—B of FIG. 30A. Reference numeral 3001 designates a glass substrate on which a grating 3002 is formed. Also, an aperture 3003 is perforated in the grating 3002. In this case, a diameter D2 of the aperture 3003 is smaller than the effective diameter D1 of the objective lens 6. The grating 3002 completely passes the 635 nm wavelength light therethrough, while the grating 3002 almost completely diffracts the 785 nm wavelength light thereby. That is, in the outside of the aperture 3003, the 635 nm wavelength light completely passed through the aperture limiting element 2801, and the 785 nm wavelength light is almost completely reflected by the aperture limiting element 2801. On the other hand, in the inside of the operture 3303, both the 635 nm wavelength light and the 785 nm wavelength light completely pass through the aperture limiting element 2801.

The pattern of the grating 3002 can be formed by etching the glass substrate 3001 or depositing silicon oxide on the glass substrate 3001. If the height and the refractive index of the grating 3002 are given by h and n, respectively, the transmittance is represented by $\cos^2(\phi/2)$ where $\phi = 2\pi(n-1)h/\lambda$. If $h = 4.14$ μm and $n = 1.46$, then $\phi = 6\pi$ for $\lambda = 635$ nm. Therefore, the transmittance is 100%. On the other hand, $\phi = 4.85\pi$ for $\lambda = 785$ nm. Therefore, the transmittance is 5.4%.

Figure 31A:
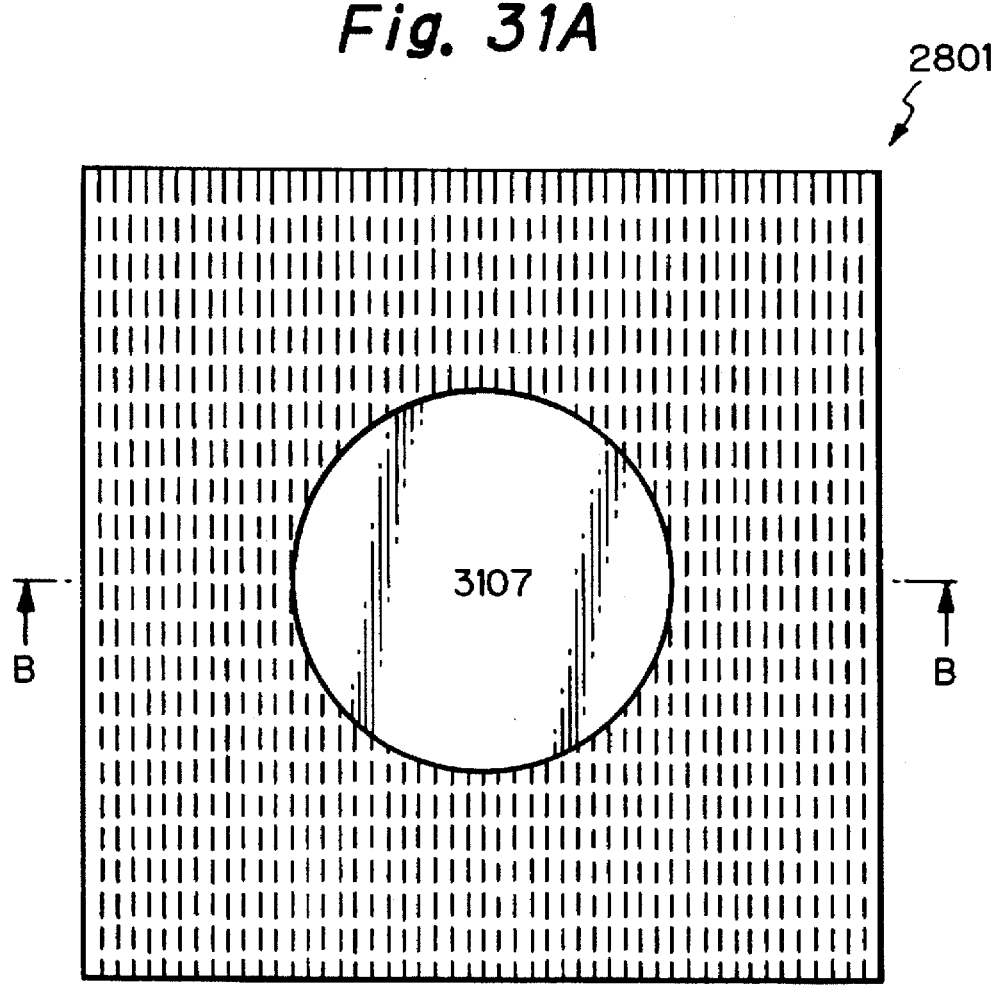
FIG. 31A is a plan view of a third example of the aperture limiting element of FIG. 28.
Figure 31B:
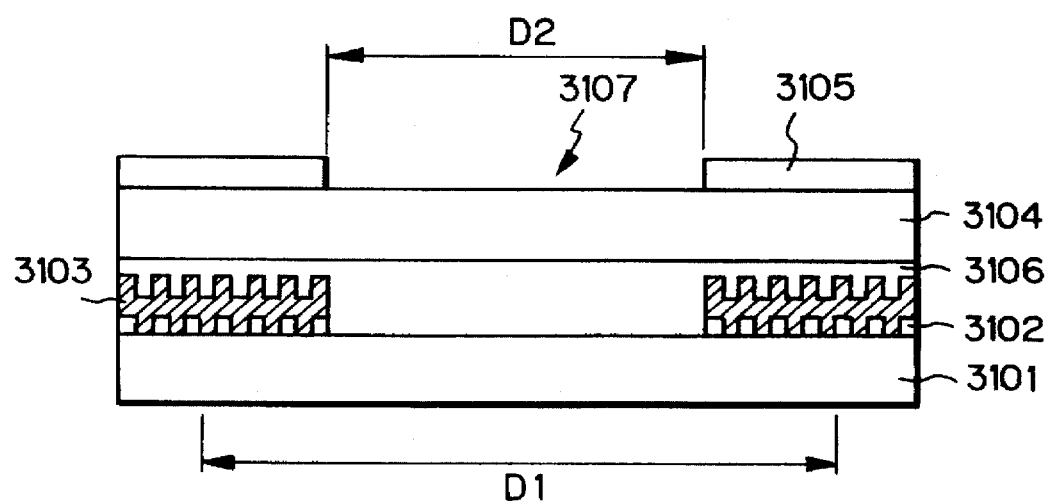
FIG. 31B is a cross-sectional view taken along the line B—B of FIG. 31A.

FIG. 31A is a plan view of a third example of the aperture limiting element 2801 of FIG. 28, and FIG. 31B is a cross-sectional view taken along the line B—B of FIG. 31A. Reference numeral 3101 designates a glass substrate on which a grating 3102, an interference filter layer 3103 are formed. Also, reference numeral 3104 designates a glass substrate on which a phase compensation layer 3108 is formed. The glass substrates 3101 and 3104 are adhered by adhesives 3106. Also, an aperture 3107 is perforated in the grating 3102, the interference filter layer 3103 and the phase compensation layer 3105. In this case, a diameter D2 of the interference 3107 is smaller than an effective diameter D1 of the objective lens 6. The interference filter layer 3103 completely passes the 635 nm wavelength light therethrough, while the interference filter layer 3103 completely reflects the 785 nm wavelength light thereby. The phase compensation layer 3105 adjusts a phase difference between the 635 nm wavelength light passed through the grating 3102, the interference filter layer 3103 and the phase compensation layer 3105 and the 635 nm wavelength light passed through the adhesives 3106 and the air, so that this phase difference is brought close to $2\pi$.

That is, in the outside of the aperture 3107, the 635 nm wavelength light completely passes through the aperture limiting element 2801, and the 785 nm wavelength light is completely reflected by the aperture limiting element 2801. On the other hand, in the inside of the aperture 3107, both the 635 nm wavelength light and the 785 nm wavelength light completely pass through the aperture limiting element 2801.

The pattern of the grating 3102 can be formed by etching the glass substrate 3101 or depositing silicon oxide on the glass substrate 3101. The grating 3102 does not operate for the light beam which passes through the interference filter 3103, while it does operate for the reflected light beam which is reflected by the interference filter film 3103. The interference fringes of the grating 3102 can be concentric circular as well as concentrically linear. If the height and refractive index of the grating 3102 are given by h and n, respectively, the reflectance is represented by $\cos^2(\phi/2)$ where $\phi = 4\pi n h/\lambda$. If $h = 134$ nm and $n = 1.46$, then $\phi = \pi$ for $\lambda = 785$ nm. Therefore, the reflectance is 0%, which means that the 785 mm wavelength light is completely reflected by the grating 3102.

The interference filter layer 3103 can be formed by an alternate stacked configuration of an odd number of high refractive index layers and an even number of low refractive index layers in the same way as the interference filter layer 2902 of FIG. 29B.

The phase compensation layer 3105 can be made of silicon oxide. Also, the adhesives 3106 has approximately the same refractive index as the grating 3102.

In FIGS. 29A, 29B, 30A, 30B, 31A and 31B, if f is the focal length of the objective lens 6, the numerical aperture for the 635 nm wavelength light is given by D1/2f and the numerical aperture for the 785 nm wavelength light is given by D2/2f. For example, f=3 mm, D1=1.56·2 mm and D2=1.35·2 mm, then, D1/2f=0.52 and D2/2f=0.45. Therefore, it is possible to read a digital video disk by using the 635 nm wavelength light beam and the objective lens means (6, 2801) having the numerical aperture of 0.52. Also, it is possible to read a compact disk including a CD-R by using the 785 nm wavelength light beam and the objective lens means (6, 2801) having the numerical aperture of 0.45.

Further, in FIG. 28, it is possible to form the aperture limiting element 2801 directly on the objective lens 6.

Figure 32:
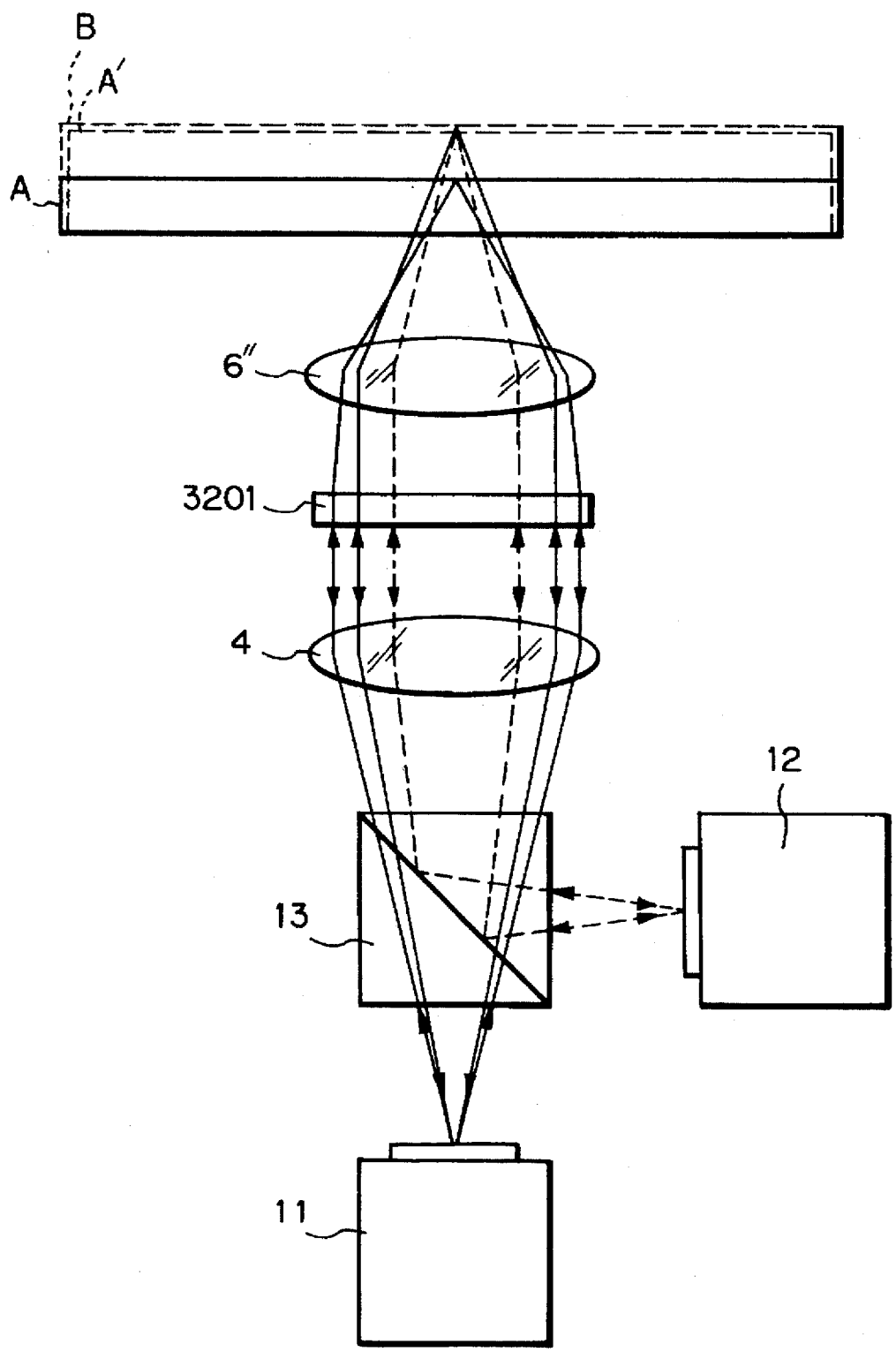
FIG. 32 is a diagram illustrating a sixth embodiment of the optical head apparatus according to the present invention.

In FIG. 32, which illustrates a sixth embodiment of the present invention, reference A designates a high density thin disk, A' designates a high density thick disk and B designates a low density thick disk. That is, the sixth embodiment as illustrated in FIG. 32 corresponds to a combination of the second embodiment as illustrated in FIG. 8 and the fifth embodiment as illustrated in FIG. 28. Therefore, in FIG. 32, the holographic optical element 5" of FIG. 8 and the aperture limiting element 2801 of FIG. 28 are combined into an aperture limiting holographic optical element 3201.

The 635 nm wavelength light beam emitted from the laser diode of the module 11 passes through the interference filter 13 and is incident to the collimator lens 4 which generates a collimated light beam. The collimated light beam is incident to the aperture limiting holographic optical element 3201. In this case, the light beam from the collimator lens 4 passes through the entire aperture limiting holographic optical element 3201, so that the numerical aperture for this light beam is large. Also, the aperture limiting holographic optical element 3201 generates a zeroth order (transmission) light beam and a +1st order diffraction light beam. The +1st order diffraction light beam is incident as a convergent light beam to the objective lens 6", and then, is focused on the disk A.

Also, the transmission light beam is incident as a collimated light beam to the objective lens 6', and then, is focused on the disk A'. A reflected light beam from the disk A or A' is again incident via the objective lens 6" to the aperture limiting holographic optical element 3201 and is split into a zeroth order (transmission) light beam and a +1st order diffraction light beam at the aperture limiting holographic optical element 3201. The +1st order diffraction light beam from the disk A and the transmission light beam from the disk A' passes through the interference filter 13 to reach the photodetector of the module 11.

On the other hand, the 785 nm wavelength light beam emitted from the laser diode of the module 12 is reflected by the interference filter 13 and is incident to the collimator lens 4 which generates a collimated light beam. The collimated light beam is incident to the aperture limiting holographic optical element 3201. In this case, the light beam from the collimator lens 4 passes through only a central portion of the aperture limiting holographic optical element 3201, so that the numerical aperture for this light beam is small. A zeroth order (transmission) light beam of the aperture limiting holographic optical element 3201 is incident as a collimated light beam to the objective lens 6", and then, is focused on the disk B. A reflected light beam from the disk B is again incident via the objective lens 6" to the aperture limiting holographic optical element 3201. The zeroth order (transmission) light beam of the aperture limiting holographical optical element 3201 is reflected by the interference filter 13 and reaches the photodetector of the module 12.

In FIG. 32, the objective lens 6" has a spherical aberration capable of compensating for a spherical aberration caused when the outgoing transmission light beam of the objective lens 6" is incident to the disk A' or B and returns therefrom. Therefore, the zeroth order (transmission) light beam of the aperture limiting holographic optical element 3201 can be focused at the disk A' or B without aberrations. On the other hand, the aperture limiting holographic optical element 3201 has a spherical aberration capable of compensating for a sum of a spherical aberration caused when the 635 nm wavelength outgoing +1st order diffraction light beam of the aperture limiting holographic optical element 3201 is incident to the disk A and returns therefrom and a spherical aberration of the objective lens 6" caused when the outgoing +1st order diffraction 635 nm wavelength light beam of the aperture limiting holographic optical element 3201 is incident to the objective lens 6" and returns therefrom. Therefore, the +1st order diffraction 635 nm wavelength light beam of the aperture limiting holographic optical element 3201 can be focused at the disk A without aberrations.

Figure 34A:
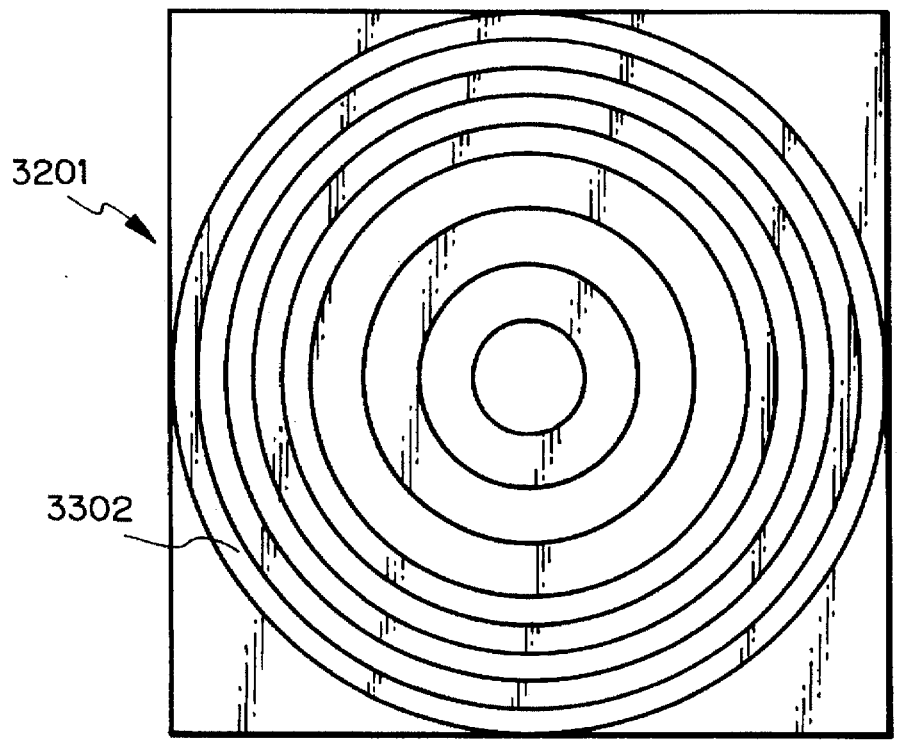
FIG. 34A is a front plan view of the element of FIG. 33.
Figure 34B:
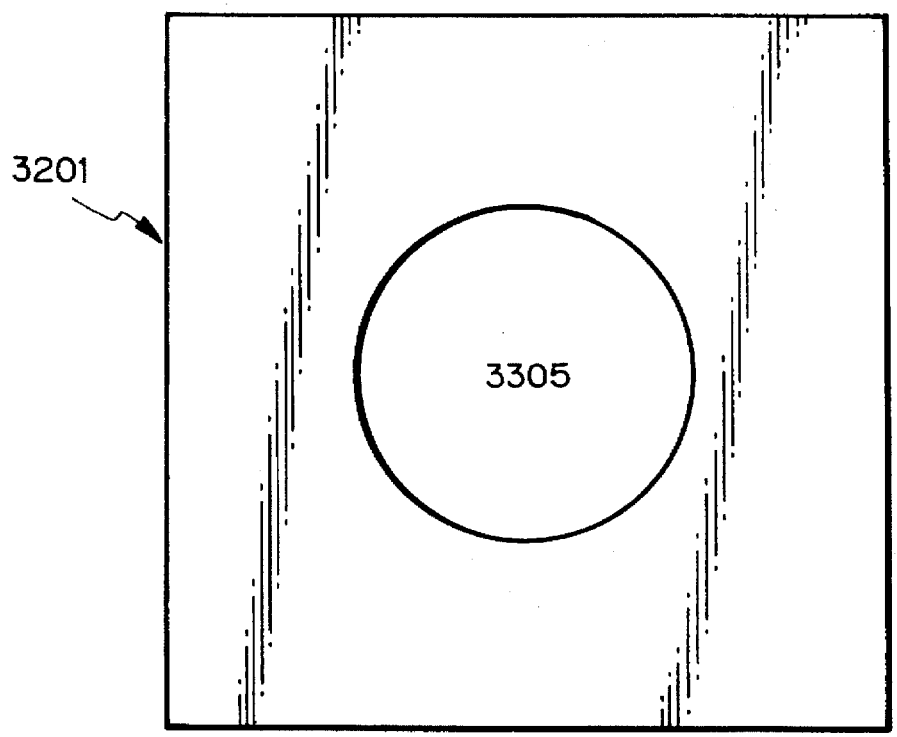
FIGS. 34B is a rear plan view of the element of FIG. 33.

FIG. 33 is a cross-sectional view of a first example of the aperture limiting holographic optical element 3201 of FIG. 32, and FIGS. 34A and 34B are a front plan view and a rear plan view of the aperture limiting holographic optical element 3201 of FIG. 33.

As illustrated in FIGS. 33 and 34A, a hologram 3302 is formed on a glass substrate 3301. That is, saw-tooth concentric interference fringes 3302a are provided inside the area having a diameter D2 smaller than the effective diameter D1 of the objective lens 6", and rectangular concentric interference fringes 3302b are provided outside the area having a diameter D2. In this case, if the height of the hologram is 2h, the refractive index is n, and the wavelength of the incident light is $\lambda$, the transmittance $\eta_0$ and the diffraction efficiency $\eta_{+1}$ of the +1st order diffraction light inside the area having a diameter D2 are represented by $$\eta_0 = (\sin^2\phi)/\phi^2 \quad (6)$$

$$\eta_{+1} = (\sin^2\phi)/(\phi-\pi)^2 \quad (7)$$

where $\phi = 2\pi(n-1)h/\lambda$

Therefore, if h=345 nm and n=1.46, $\phi = \pi/2$ for $\lambda=635$ nm

Then, $\eta_0 = \eta_{+1} = 0.405$

Also, $\phi = 0.404\pi$ for $\lambda=785$ nm $\eta_0 = 0.566$

On the other hand, the transmittance $\eta_0$ and the diffraction efficiency $\eta_{+1}$ of the +1st order diffraction light outside the area having a diameter D2 are represented by $$\eta_0 = \cos^2(\phi/2) \quad (8)$$

$$\eta_{+1} = 4\pi^2 \sin^2(\phi/2) \quad (9)$$

where $\phi = 4\pi (n-1)h/\lambda$

Therefore, if h=345 nm and n=1.46, $\phi = \pi$ for $\lambda=635$ nm

Then, $\eta_0 = 0$ $\eta_{+1} = 0.405$

Thus, in the hologram 3302, about 40.5% of the 635 nm wavelength light beam passes through the area having a diameter D2 as a transmission light beam, and about 40.5% of the 635 nm wavelength light beam is diffracted by the area having a diameter D1 as a +1st order diffraction light beam. Also, about 56.6% of the 785 nm wavelength light beam passes through the having a diameter D2 as a transmission light beam.

Thus, the hologram 3302 can compensate for the above-described spherical aberration of the +1st order diffraction 635 nm wavelength light beam, and also can serve as a convex lens for the +1st order diffraction 635 nm wavelength light beam. As a result, the focal point of the +1st order diffraction light beam at the disk A is near from the focal point of the transmission light beam at the disk A' or B, so that the distance between the surface of the disk A and the objective lens 6" can be about the same as the distance between the surface of the disk A' or B and the objective lens 6".

As illustrated in FIGS. 33 and 34B, an interference filter layer 3303 and a phase compensation layer 3304 are formed on a glass substrate 3301. Also, an aperture 3305 is perforated in the interference filter layer 3303 and the phase compensation layer 3304. In this case, a diameter D3 of the aperture 3305 is smaller than the diameter D2. The interference filter layer 3303 completely passes the 635 nm wavelength light therethrough, while the interference filter layer 3303 completely reflects the 785 nm wavelength light. The phase compensation layer 3704 adjusts a phase difference between the 635 nm wavelength light passed through the interference filter layer 3303 and the phase compensation layer 3304 and the 635 nm wavelength light passed through the air so that this phase difference is brought close to $2\pi$. That is, in the area outside of the aperture 3308, the 635 nm wavelength light completely passes therethrough, and the 785 nm wavelength light is completely reflected thereby. On the other hand, in the inside of the aperture 3308, both the 635 nm wavelength light and the 785 nm wavelength light completely pass therethrough.

The interference filter layer 3303 and the phase compensation layer 3304 can be formed in the same way as the interference filter layer 2902 and the phase compensation layer 2903 of FIG. 29B.

Figure 36A:
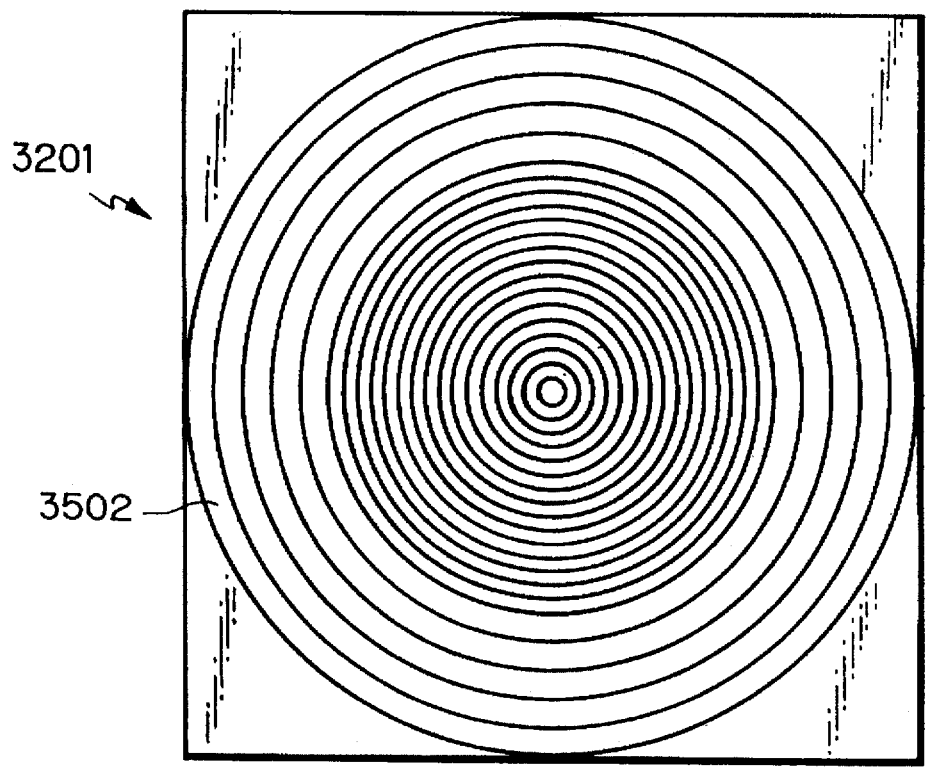
FIG. 36A is a front plan view of the element of FIG. 35.
Figure 36B:
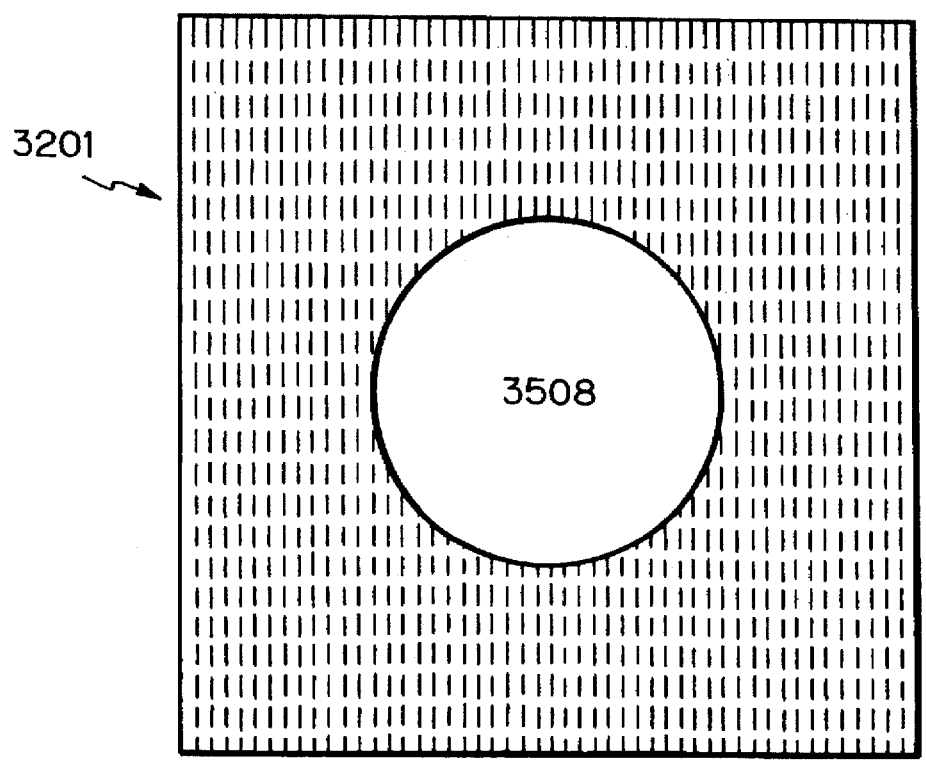
FIGS. 36B is a rear plan view of the element of FIG. 35.

FIG. 35 is a cross-sectional view of a second example of the aperture limiting holographic optical element 3201 of FIG. 32, and FIGS. 36A and 36B are a front plan view and a rear plan view of the aperture limiting holographic optical element 3201 of FIG. 35.

As illustrated in FIGS. 35 and 36A, a hologram 3502 is formed on a glass substrate 3501. That is, staircase concentric interference fringes 3502a are provided inside of the area having a diameter D2 smaller than the effective diameter D1 of the objective lens 6", and rectangular concentric interference fringes 3502b are provided outside the area having a diameter D2. In this case, if the height of the hologram is 3/2, the refractive index is n, and the wavelength of the incident light is $\lambda$, the transmittance $\eta_o$ and the diffraction efficiency $\eta_{+1}$ of the +1st order diffraction light in the area having a diameter D2 are represented by the above-described formulae (3) and (4).

Therefore, if h=345 nm and n=1.46, $\phi=\pi/2$ for $\lambda=635$ nm

Then, $\eta_o=0.427$ $\eta_{+1}=0.346$

Also, $\phi=0.404\pi$ for $\lambda=785$ nm

Then, $\eta_o=0.588$

On the other hand, the transmittance $\eta_o$ and the diffraction efficiency $\eta_{+1}$ of +1st order diffraction light outside the area having a diameter D2 are represented by $$\eta_o=\cos^2(\phi/2) \quad (10)$$

$$\eta_{+1}=(4/\pi^2)\sin^2(\phi/2) \quad (11)$$

where $\phi=3\pi(n-1)h/\lambda$

Therefore, if h=345 nm and n=1.46, $\phi=3\pi/4$ for $\lambda=635$ nm

Then, $\eta_o=0.146$ $\eta_{+1}=0.346$

Thus, in the hologram 3502, about 42.7% of the 635 nm wavelength light beam passes through the area inside the area having a diameter D2 as a transmission light beam, and about 14.6% of the 635 nm wavelength light beam passes through the area having diameter D2 as a transmission light beam. Also, about 34.6% of the 635 nm wavelength light beam is diffracted by the area having a diameter D1 as a +1st order diffraction light beam. Therefore, the efficiency of the outgoing and incoming 635 nm wavelength light beam is 18.2% in the area inside the area having a diameter D2 and 2.1% in the area outside the area having a diameter D2. The latter efficiency is neglible as compared with the former efficiency. Also, about 58.5% of the 785 nm wavelength light beam passes through the area having a diameter D2 as a transmission light beam.

Thus, the hologram 3402 can compensate for the above-described spherical aberration of the +1st order diffraction 638 nm wavelength light beam, and also can serve as a convex lens for the +1st order diffraction 638 nm wavelength light beam. As a result, the focal point of the +1st order diffraction light beam at the disk A is near from the focal point of the transmission light beam at the disk A' or B, so that the distance between the surface of the disk A and the objective lens 6" can be about the same as the distance between the surface of the disk A' or B and the objective lens 6".

As illustrated in FIGS. 35 and 36B, a grating 3504 and an interference filter layer 3505 are formed on a front surface of a glass substrate 3503, and a phase compensation layer 3506 is formed on a rear surface of the glass substrate 3503. In this case, the glass substrates 3501 and 3503 are adhered by adhesives 3507. Also, an aperture 3508 is perforated in the grating 3504, the interference filter layer 3505 and the phase compensation layer 3506. In this case, a diameter 53 of the aperture 3508 is smaller than the diameter D2. The interference filter layer 3505 completely passes the 635 nm wavelength light therethrough, while the interference filter layer 3505 completely reflects the 785 nm wavelength light thereby. The phase compensation layer 3506 adjust a phase difference between the 635 nm wavelength light passed through the grating 3504, the interference filter layer 3505 and the phase compensation layer 3506 and the 635 nm wavelength light passed through the adhesives 3507 and the air, so that this phase difference is brought close to $2\pi$.

That is, in the outside of the aperture 3508, the 635 nm wavelength light completely passes through the aperture limiting holographic optical element 3201, and the 785 nm wavelength light is completely reflected by the aperture limiting holographic optical element 3201. On the other hand, in the inside of the aperture 3058, both the 635 nm wavelength light and the 785 nm wavelength light completely pass through the aperture limiting holographic optical element 3201.

The hologram 3502 can be formed in the same way as the holographic optical element 5' as illustrated in FIGS. 6A and 6B.

The grating 3504, the interterence filter layer 3505 and the phase compensation layer 3506 can be formed in the same way as the grating 3102, the interterence filter layer 3103 and the phase compensation layer 3105 of FIG. 31B.

As explained hereinabove, according to the present invention, an optimum reading operation can be carried out for two or more different types of disks in which the thickness is different and/or the density is different.

I claim:

1. An optical head apparatus comprising:
   a first light source for emitting a first light beam having a first wavelength;
   a second light source for emitting a second light beam having a second wavelength different from said first wavelength;
   optical combining means for combining said first light beam and said second light beam;
   a holographic optical element for receiving said first light beam and said second light beam from said optical combining means to generate a zeroth order light beam of said first light beam and one of ±1st order diffraction light beams of said second light beam;
   an objective lens for converging said zeroth order light beam at a first optical recording medium having a first thickness and converging said one of ±1st order diffraction light beams at a second optical recording medium having a second thickness different from said first thickness;
   photodetector means;
   a first reflected light beam of said zeroth order light beam reflected by said first optical recording medium passing through said objective lens, said holographic optical element and said optical combining means to said photodetector means,
   a second reflected light beam of said one of ±1st order diffraction light beams reflected by said second optical recording medium passing through said objective lens, said holographic optical element and said optical combining means to said photodetector means.

2. The apparatus as set forth in claim 1, wherein said objective lens has a spherical aberration capable of compensating a spherical aberration caused when said zeroth order light beam is incident to said first optical recording medium and returns from said first optical recording medium, said holographic optical element having a spherical aberration capable of compensating a sum of a spherical aberration caused when said one of ±1st order diffraction light beams is incident to said second optical recording medium and returns from said second optical recording medium and a spherical aberration caused when said one of ±1st order diffraction light beams is incident to said objective lens and returns from said objective lens.

3. The apparatus as set forth in claim 1, wherein said holographic optical element comprises:

a glass substrate; and concentric interference fringes on an area of said glass substrate, said area having a diameter smaller than an effective diameter of said objective lens.

4. The apparatus as set forth in claim 3, wherein said concentric interference fringes have a multilevel staircase cross-section.

5. The apparatus as set forth in claim 1, wherein said holographic optical element comprises:

a glass substrate;

concentric interference fringes on a first area of a front surface of said glass substrate, said first area having a diameter approximately the same as an effective diameter of said objective lens;

an interference filter layer; and a phase compensation layer, said interference filter layer and said phase compensation layer being formed outside a second area of a rear surface of said glass substrate, said second area having a diameter smaller than the effective diameter of said objective lens.

6. The apparatus as set forth in claim 5, wherein said concentric interference fringes have a multilevel staircase cross-section.

7. The apparatus as set forth in claim 1, wherein said photodetector means comprises first and second photodetectors, said optical combining means splitting said first and second reflected light beams for said first and second photodetectors, respectively.

8. The apparatus as set forth in claim 7, wherein said optical combining means transmits one of said first and second light beams and one of said first and second reflected light beams and reflects the other of said first and second light beams and the other of said first and second reflected light beams.

9. The apparatus as set forth in claim 7, wherein said optical combining means comprises a polarizing beam splitter, the one of said first and second light beams emitted from said first and second light sources being a P polarized light beam, the other of said first and second light beams emitted from said first and second light sources being an S polarized light beam.

10. The apparatus as set forth in claim 1, wherein said photodetector means comprises a single photodetector, said optical combining means transmitting one of said first and second light beams and reflecting the other of said first and second light beams and said first and second reflected light beams.

11. The apparatus as set forth in claim 10, wherein said optical combining means comprises an interference filter, the one of said first and second light beams emitted from said first and second light sources being a P polarized light beam, the other of said first and second light beams emitted from said first and second light sources being a P polarized light beam, said first and second reflected light beams being S polarized light beams.

12. The apparatus as set forth in claim 1, wherein said photodetector means comprises a single photodetector, said optical combining means transmitting one of said first and second light beams and said first and second reflected light beams and reflecting the other of said first and second light beams.

13. The apparatus as set forth in claim 12, wherein said optical combining means comprises an interference filter, the one of said first and second light beams emitted from said first and second light sources being an S polarized light beam, the other of said first and second light beams emitted from said first and second light sources being an S polarized light beam, said first and second reflected light beams being P polarized light beams.

14. The apparatus as set forth in claim 1, wherein said holographic optical element further comprises an aperture limiting element for passing one of said first and second light beams and one of said first and second reflected light beams within a first window smaller than an effective area of said objective lens and passing the other of said first and second light beams and the other of said first and second reflected light beams within a second window approximately the same as the effective area of said objective lens, said objective lens converging one of ±1st order diffraction light beams of said first light beam at a third optical recording medium having one of said first thickness and said second thickness and having a different recording density from one of said first and second optical recording medium.

15. The apparatus as set forth in claim 14, wherein said aperture limiting element comprises:

a glass substrate;

an interference filter layer; and a phase compensation layer, said interference filter layer and said phase compensation layer being formed outside of an area of said glass substrate, said area defining said first window.

16. The apparatus as set forth in claim 15, wherein said holographic optical element comprises a hologram including a saw-tooth cross-section portion and a rectangular cross-section portion formed on said glass substrate, said saw-tooth cross-section portion being largen than said first coindow and smaller than said second window.

17. The apparatus as set forth in claim 14, wherein said aperture limiting element comprises:

a first glass substrate;

a second glass substrate;

a grating;

an interference filter layer; and a phase compensation layer, said grating, said interference filter layer and said phase compensation layer being formed outside of an area of said glass substrate, said area defining said first window.

18. The apparatus as set forth in claim 17, wherein said holographic optical element comprises a hologram including a multilevel staircase cross-section portion and a rectangular cross-section portion formed on said first glass substrate, said multilevel staircase cross-section portion being larger than said first window and smaller than said second window.

19. An optical head apparatus comprising:

a first light source for emitting a first light beam having a first wavelength;

a second light source for emitting a second light beam having a second wavelength different from said first wavelength;

optical combining means for combining said first light beam and said second light beam;

an objective lens for converging said first light beam at a first optical recording medium having a first recording density and converging said second light beam at a second optical recording medium having a second recording density different from said first recording density;

an aperture limiting element, provided between said optical combining means and said objective lens, for passing said first light beam and a first reflected light beam of said first light beam by said first optical recording medium within a first window approximately the same as an effective area of said objective lens and passing said second light beam and a second reflected light beam of said second light beam by said second optical recording medium within a second window smaller than the effective area of said objective lens and;

photodetector means for receiving said first and second reflected light beams passing through said objective lens said aperture limiting element and said optical combining means.

20. The apparatus as set forth in claim 19, wherein said opening limiting element comprises:

a glass substrate;

an interference filter layer; and a phase compensation layer, said interference filter layer and said phase compensation layer being formed outside of an area of said glass substrate, said area defining said second window.

21. The apparatus as set forth in claim 20, wherein said interference filter layer comprises an alternately stacked configuration of an odd number of high refractive index layers and an even number of low refractive index layers, to satisfy the following:

$$n_1 \cdot d_1 = n_2 \cdot d_2 = \lambda/4$$

where $n_1$ is a refractive index of said high refractive index layers, $d_1$ is a thickness of said high refractive index layers, $n_2$ is a refractive index of said low refractive index layers, $d_2$ is a thickness of said low refractive index layers, and $\lambda$ is said second wavelength.

22. The apparatus as set forth in claim 19, wherein said opening limiting element comprises:

a glass substrate; and a grating, said grating being formed outside of an area of said glass substrate, said area defining said second window.

23. The apparatus as set forth in claim 19, wherein said aperture limiting element comprises:

a first glass substrate;

a grating formed on said first glass substrate;

an interference filter layer formed on said first glass substrate;

a second glass substrate; and a phase compensation layer formed on said second glass substrate, said second glass substrate being adhered to said first glass substrate by adhesives, said grating, said interference filter layer and said phase compensation layer being formed outside of an area of said glass substrates, said area defining said second window.

24. The apparatus as set forth in claim 23, wherein said interference filter layer comprises an alternately stacked configuration of an odd number of high refractive index layers and an even number of low refractive index layers, to satisfy the following:

$$n_1 \cdot d_1 = n_2 \cdot d_2 = \lambda/4$$

where $n_1$ is a refractive index of said high refractive index layers, $d_1$ is a thickness of said high refractive index layers, $n_2$ is a refractive index of said low refractive index layers, $d_2$ is a thickness of said low refractive index layers, and $\lambda$ is said second wavelength.

* * * * *

UNITED STATES PATENT AND TRADEMARK OFFICE
CERTIFICATE OF CORRECTION

PATENT NO. : 5,696,750
DATED : December 9, 1997
INVENTOR(S) : Ryuichi Katayama

It is certified that error appears in the above-indentified patent and that said Letters Patent is hereby corrected as shown below:

```
Column 3, line 15, "FIGS" should be --FIG--.
Column 5, line 30, delete "," (comma) (second occurrence).
Column 10, line 7, "a" should be --as--.
Column 10, line 40, delete "," (comma), and insert --,-- (comma)
  after "beam)".
Column 10, line 58, "outgoes upward" should be --goes out in an
  upward direction--.
Column 10, line 65, "goes upward" should be --goes out in an upward
  direction--.
Column 11, line 7, "offaxial" should be --off-axial--.
Column 11, line 32, "at the backwardward of" should be --behind--.
Column 11, line 34, "at the forward of" should be --ahead--.
Column 13, line 34, "offaxial" should be --off-axial--.
Column 14, line 3, "forward" should be --front--.
Column 21, line 53, "is" should be --can be considered--.
Column 22, line 13, "adjust" should be --adjusts--.
Claim 19, column 25, line 37, "and;" should be --; and--.
```

Signed and Sealed this

Twenty-first Day of April, 1998

*Attest:*

*Attesting Officer*

BRUCE LEHMAN

*Commissioner of Patents and Trademarks*